US012604296B2

(12) United States Patent
Zhao et al.

(10) Patent No.:     US 12,604,296 B2
(45) Date of Patent:       Apr. 14, 2026

(54) NETWORKED ULTRAWIDEBAND POSITIONING

(71) Applicant: QUALCOMM Incorporated, San Diego, CA (US)

(72) Inventors: Liang Zhao, Saratoga, CA (US); Le Nguyen Luong, San Diego, CA (US); Cheng-Han Wang, San Jose, CA (US); Bala Ramasamy, San Marcos, CA (US); Santosh Kumar Gupta, San Jose, CA (US); Yi Zeng, San Jose, CA (US); Chan Hong Park, San Jose, CA (US); Koorosh Akhavan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 336 days.

(21) Appl. No.: 17/874,571

(22) Filed: Jul. 27, 2022

(65) Prior Publication Data

US 2024/0040538 A1     Feb. 1, 2024

(51) Int. Cl.
| | |
|---|---|
| *H04W 64/00* | (2009.01) |
| *G01S 19/48* | (2010.01) |
| *H04B 1/719* | (2011.01) |

(52) U.S. Cl.
CPC ........... *H04W 64/003* (2013.01); *G01S 19/48* (2013.01); *H04B 1/719* (2013.01)

(58) Field of Classification Search
CPC .... H04W 64/003; G01S 19/48; G01S 5/0242; G01S 5/0249; G01S 5/289; G01S 5/14; H04B 1/719

USPC ....................................................... 455/456.1
See application file for complete search history.

(56) References Cited

U.S. PATENT DOCUMENTS

| | | | | |
|---|---|---|---|---|
| 2004/0002346 A1* | 1/2004 | Santhoff | ............... | H04W 60/00 |
| | | | | 455/456.2 |
| 2011/0059752 A1* | 3/2011 | Garin | .................... | G01S 5/0289 |
| | | | | 455/456.1 |
| 2015/0094081 A1* | 4/2015 | Gupta | ................. | H04W 64/003 |
| | | | | 455/456.1 |
| 2015/0350850 A1* | 12/2015 | Edge | ..................... | H04W 88/02 |
| | | | | 455/456.1 |
| 2020/0319289 A1* | 10/2020 | Borsos | ..................... | G01S 5/06 |

(Continued)

FOREIGN PATENT DOCUMENTS

| | | |
|---|---|---|
| EP | 3710850 A1 | 9/2020 |
| WO | 2017051062 A1 | 3/2017 |

OTHER PUBLICATIONS

International Search Report and Written Opinion—PCT/US2023/023517—ISA/EPO—Sep. 11, 2023.

*Primary Examiner* — Syed Haider

(74) *Attorney, Agent, or Firm* — Thien T. Nguyen

(57)     ABSTRACT

Techniques are provided for determining the location of ultrawideband (UWB) devices in a network. An example method for providing location information associated with a target device in a UWB network includes determining a location of a bridge device, querying the bridge device for location information associated with the target device, receiving location information associated with the target device from the bridge device, and determining a location of the target device based at least in part on the location of the bridge device and the location information associated with the target device.

26 Claims, 16 Drawing Sheets

(56) References Cited

U.S. PATENT DOCUMENTS

2020/0408927 A1* 12/2020 Youssef ................. G01S 19/48
2022/0201434 A1* 6/2022 Nguyen ............... H04W 4/029

* cited by examiner

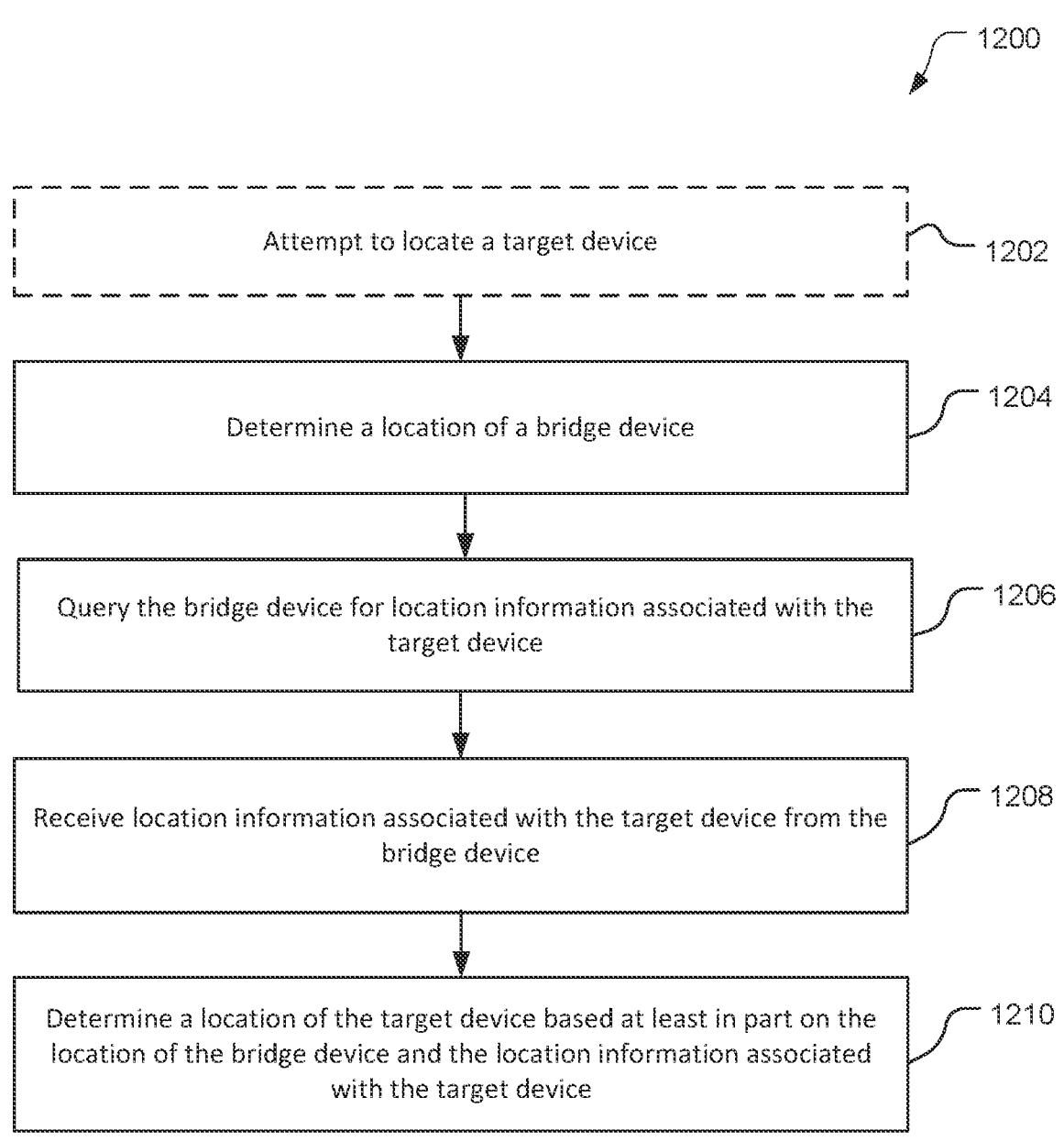

1200

Attempt to locate a target device — 1202

Determine a location of a bridge device — 1204

Query the bridge device for location information associated with the target device — 1206

Receive location information associated with the target device from the bridge device — 1208

Determine a location of the target device based at least in part on the location of the bridge device and the location information associated with the target device — 1210

*FIG. 12*

NETWORKED ULTRAWIDEBAND POSITIONING

BACKGROUND

The use of wireless devices for many everyday activities is becoming common. Modern wireless devices may make use of one or more wireless communication technologies. For example, a wireless device may communicate using a short range communication technology such as Bluetooth technology, ultrawideband (UWB) technology, millimeter wave (mmWave) technology, etc. The use of short range communication technologies, such as Bluetooth, in wireless devices has become much more common in the last several years and is regularly used in retail businesses, offices, homes, cars, manufacturing operations, and public gathering places. The larger bandwidth of UWB devices may be beneficial for ranging protocols used in high security applications such as digital keys. The range accuracy associated with UWB devices may degrade in some use cases such as at long range or when the line of sight between the UWB devices is obstructed. There is a need to improve the ranging accuracy for UWB devices to support multiple use cases.

SUMMARY

An example method for providing location information associated with a target device in a ultrawideband (UWB) network according to the disclosure includes determining a location of a bridge device, querying the bridge device for location information associated with the target device, receiving location information associated with the target device from the bridge device, and determining a location of the target device based at least in part on the location of the bridge device and the location information associated with the target device.

Implementations of such a method may include one or more of the following features. The location information received from the bridge device may include a first range and a first bearing to the target device obtained when the bridge device is in a first orientation, and a second range and a second bearing to the target device obtained when the bridge device is in a second orientation. Determining the location of the bridge device may include utilizing a UWB radio access technology and querying the bridge device may include utilizing a radio access technology that is different than the UWB radio access technology. Querying the bridge device may include utilizing a WiFi based radio access technology or a Bluetooth based radio access technology. The bridge device may be a mobile device configured to periodically move from a first location in a coverage area of the UWB network to a second location in the coverage area of the UWB network. The method may include attempting to locate the target device utilizing a UWB radio access technology. The method may include determining a first position accuracy value for the target device based on an attempt to locate the target device utilizing the UWB radio access technology, determining a second position accuracy value for the target device based on the location of the bridge device and the location information associated with the target device, and determining the location of the target device based at least in part on a comparison of the first position accuracy value and the second position accuracy value. Determining the location of the target device may include comparing the first position accuracy value or the second position accuracy value to a threshold. The method may include determining a satellite based position estimate with a satellite positioning system receiver or a terrestrial based position estimate with a communications transceiver, and determining the location of the target device based at least in part on the location of the bridge device, the location information associated with the target device, and the satellite based position estimate or the terrestrial based position estimate. The target device may be a router or small cellular transceiver. The location information may include interference information obtained by the bridge device.

An example apparatus according to the disclosure includes a memory, at least one transceiver, at least one processor communicatively coupled to the memory and the at least one transceiver, and configured to determine a location of a bridge device, query the bridge device for location information associated with a target device, receive the location information associated with the target device from the bridge device, and determine a location of the target device based at least in part on the location of the bridge device and the location information associated with the target device.

An example method for providing location information associated with a target device in a ultrawideband (UWB) based network according to the disclosure includes receiving a query associated with the target device, determining location information associated with the target device, and transmitting the location information associated with the target device.

An example method for querying one or more bridge devices in a ultrawideband (UWB) network according to the disclosure includes transmitting a query associated with a target device to the one or more bridge devices, receiving location information associated with the target device from at least one of the one or more bridge devices, and transmitting the location information associated with the target device.

Items and/or techniques described herein may provide one or more of the following capabilities, as well as other capabilities not mentioned. UWB capable devices may be configured to exchange positioning signals to determine a distance between the devices (e.g., based on time-of-flight measurements) and a bearing to one another (e.g., based on angle-of-arrival measurements). UWB signals, however, have a limited range (e.g., 100 m) and may be attenuated by barriers which obstruct the line-of-sight path. The attenuation may completely impede, or otherwise reduce the accuracy of, the range and bearing measurements between a searching device and a target device. In such a use case, the searching device may be configured to exchange position measurements with nearby UWB capable devices and request location information for the target device. The nearby UWB capable devices may be configured to exchange positioning signals with the target device and provide location information to the searching device. The searching device may determine a relative location of the target device based on the locations of the nearby UWB capable devices and the location information associated with the target device provided by the nearby UWB capable devices. One or more nearby UWB capable devices may perform as bridge devices between the searching and target devices. The searching device may be configured to compare the resulting position estimates obtained with different combinations of bridge devices and/or via a direct exchange with the target device to determine the most accurate position estimate. The accuracy of UWB based positioning may be increased. UWB positioning techniques may be utilized in areas with obstructions which previously prevented the effective the use of UWB positioning signals. Other capabilities may be provided and not every implementation according to the disclosure must provide any, let alone all, of the capabilities discussed.

BRIEF DESCRIPTION OF THE DRAWINGS

FIG. 12 is an example process flow for a method of determining the location of a target device in an UWB network.

DETAILED DESCRIPTION

Figure 1:
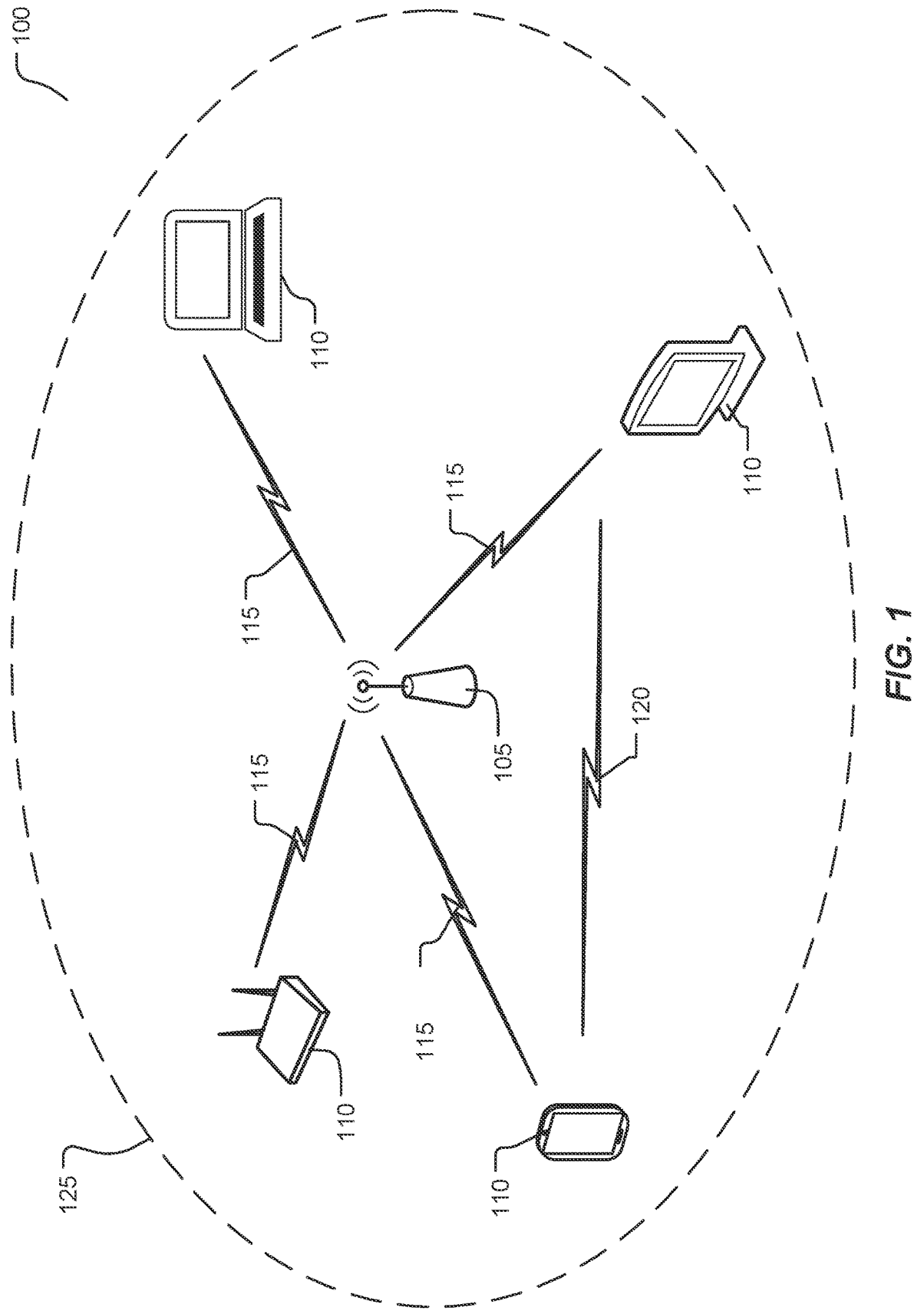
FIG. 1 is a block diagram of an example wireless local area network (WLAN).

Techniques are discussed herein for determining the location of ultrawideband (UWB) devices in a network. UWB positioning technology may be utilized to provide accurate relative positioning between devices within a limited range (e.g., 100 m). For example, two UWB devices may be configured to exchange UWB radio frequency signals to determine time-of-flight (ToF) and angle-of-arrival (AoA) information for the RF signals. UWB capable devices may be configured to utilize a 500 MHz spectrum with 2 nanosecond (ns) pulses for position measurements. UWB may realize ToF ranging accuracy of approximately 7-10 cm and a AoA accuracy of 1.5-3 degrees. UWB is resilient to multipath and may utilize super resolution algorithms to achieve millimeter level range accuracy. UWB utilizes less power than WiFi and can obtain better range accuracy then Bluetooth devices. In operation, however, UWB devices are configured to utilize high frequencies signals (e.g., 6.5-8 GHz) which may be attenuated by obstructions such as furniture and other structural elements (e.g., walls, doors, etc.). Thus, when two UWB capable devices are at an extended range (e.g., >30 m) from one another, or when there are obstructions between the devices, the positioning performance and accuracy may be compromised due to the signal attenuation. The techniques provided herein utilize UWB capable bridging devices to enable a first UWB device to locate a second UWB device when the distance and/or physical features between the two devices impedes the positioning measurements.

In an example, an initiating UWB device may attempt to locate a target UWB device that is beyond the operational range of the UWB signals, and/or when there are obstructions between the two devices. The resulting attempted signal exchange between the two devices may result in no exchange (e.g., out of detection range of one another), or an inaccurate positioning result due to a low signal to noise (SNR) ratio of the exchanged signals. In response to the low quality signal exchange between the devices, the initiating device may be configured to broadcast location requests to nearby UWB devices to obtain location information for the target device. The initiating UWB may transmit a query to the bridge devices to obtain relative location information associated with the target UWB device and other bridge devices. The bridge devices may also query other bridge devices for location information associated with the target UWB device. The initiating UWB device may estimate the relative position of nearby bridge device(s) and the respective accuracy of the resulting position estimate for the target UWB device. In an example, one or more bridge devices may be mobile devices configured to move within a search area. The initiating UWB device may evaluate location information obtained from multiple bridge devices to improve the accuracy of the position estimate for the target UWB device. These techniques and configurations are examples, and other techniques and configurations may be used.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring first to FIG. 1, a block diagram illustrates an example of a WLAN network 100 such as, e.g., a network implementing IEEE 802.11 and IEEE 802.15 families of standards. The WLAN network 100 may include an access point (AP) 105 and one or more wireless devices 110 or stations (STAs) 110, such as mobile stations, head mounted devices (HMDs), personal digital assistants (PDAs), asset tracking devices, other handheld devices, netbooks, notebook computers, tablet computers, laptops, display devices (e.g., TVs, computer monitors, etc.), printers, IoT devices, asset tags, etc. The AP 105 and the wireless devices 110 may be UWB capable devices. While one AP 105 is illustrated, the WLAN network 100 may have multiple APs 105. Each of the wireless devices 110, which may also be referred to as mobile stations (MSs), mobile devices, access terminals (ATs), user equipment(s) (UE), subscriber stations (SSs), or subscriber units, may associate and communicate with an AP 105 via a communication link 115. Each AP 105 has a geographic coverage area 125 such that wireless devices 110 within that area can typically communicate with the AP 105. The wireless devices 110 may be dispersed throughout the geographic coverage area 125. Each wireless device 110 may be stationary or mobile.

A wireless device 110 can be covered by more than one AP 105 and can therefore associate with one or more APs 105 at different times. A single AP 105 and an associated set of stations may be referred to as a basic service set (BSS). An extended service set (ESS) is a set of connected BSSs. A distribution system (DS) is used to connect APs 105 in an extended service set. A geographic coverage area 125 for an access point 105 may be divided into sectors making up a portion of the coverage area. The WLAN network 100 may include access points 105 of different types (e.g., metropolitan area, home network, etc.), with varying sizes of coverage areas and overlapping coverage areas for different technologies. In other examples, other wireless devices can communicate with the AP 105.

While the wireless devices 110 may communicate with each other through the AP 105 using communication links 115, each wireless device 110 may also communicate directly with one or more other wireless devices 110 via a direct wireless link 120. Two or more wireless devices 110 may communicate via a direct wireless link 120 when both wireless devices 110 are in the AP geographic coverage area 125 or when one or neither wireless device 110 is within the AP geographic coverage area 125. Examples of direct wireless links 120 may include WiFi Direct connections, connections established by using a WiFi Tunneled Direct Link Setup (TDLS) link, 5G-NR sidelink, PC5, UWB, and other P2P group connections. The wireless devices 110 in these examples may communicate according to the WLAN radio and baseband protocol including physical and MAC layers from IEEE 802.11 and IEEE 802.15, and their various versions. For example, the one or more of the wireless devices 110 and the AP 105 may be configured to utilize WiFi and UWB signals for communications and/or positioning applications.

Figure 2:
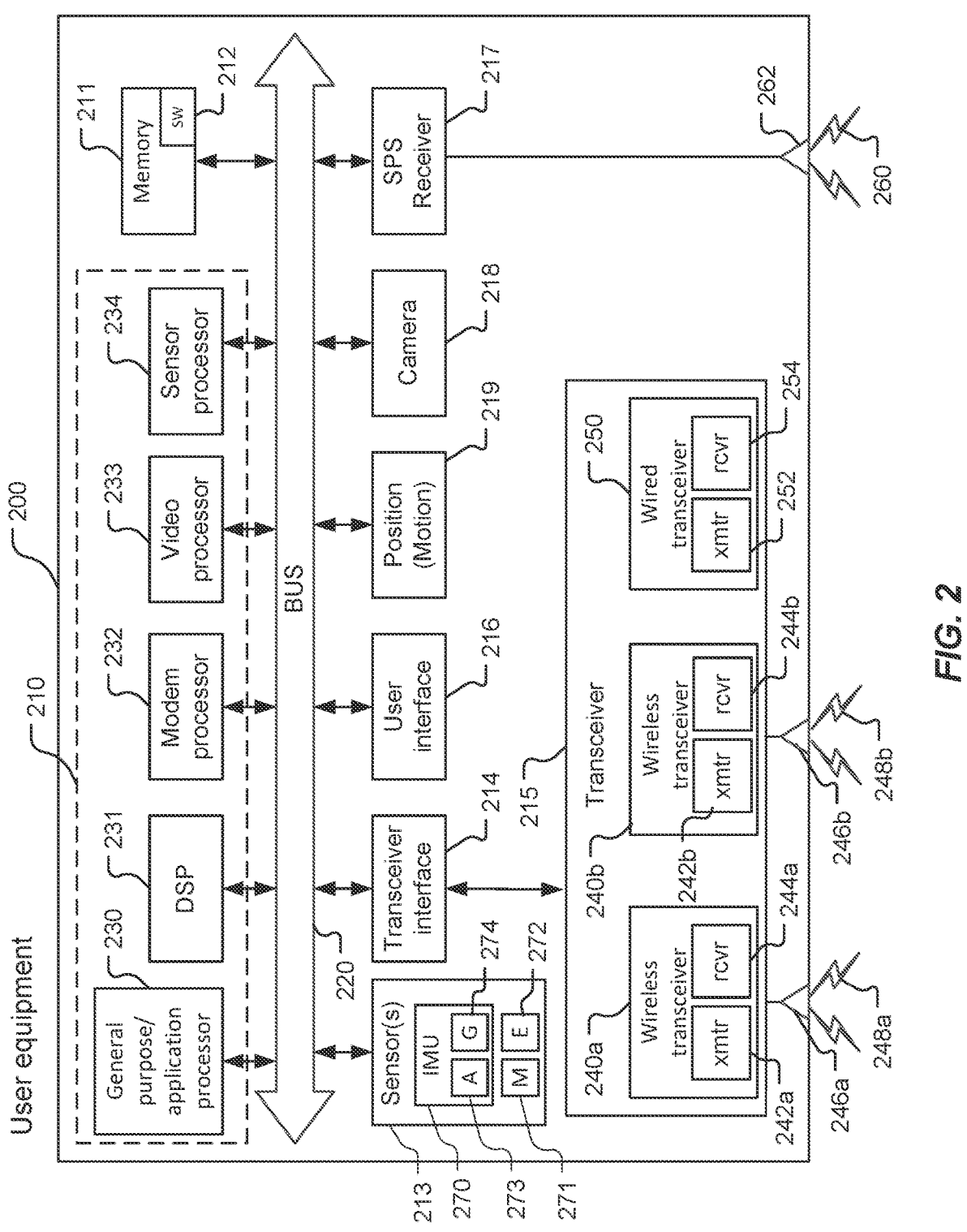
FIG. 2 is a block diagram of components of an example wireless device.

Referring also to FIG. 2, a UE 200 is an example of the wireless devices 110 and comprises a computing platform including a processor 210, memory 211 including software (SW) 212, one or more sensors 213, a transceiver interface 214 for a transceiver 215 (including one or more wireless transceivers such as a first wireless transceiver 240a, a second wireless transceiver 240b, and optionally a wired transceiver 250), a user interface 216, a Satellite Positioning System (SPS) receiver 217, a camera 218, and a position (motion) device 219. The processor 210, the memory 211, the sensor(s) 213, the transceiver interface 214, the user interface 216, the SPS receiver 217, the camera 218, and the position (motion) device 219 may be communicatively coupled to each other by a bus 220 (which may be configured, e.g., for optical and/or electrical communication). One or more of the shown apparatuses (e.g., the camera 218, the position (motion) device 219, and/or one or more of the sensor(s) 213, etc.) may be omitted from the UE 200. The processor 210 may include one or more hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for radio frequency (RF) sensing and ultrasound. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software (which may also include firmware) 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210. e.g., when compiled and executed, to perform the functions. The description may refer to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceivers 240a-b. Other example configurations include one or more of the processors 230-234 of the processor 210, the memory 211, the wireless transceivers 240a-b, and one or more of the sensor(s) 213, the user interface 216, the SPS receiver 217, the camera 218, the PMD 219, and/or the wired transceiver 250. Other configurations may not include all of the components of the UE 200. For example, an IoT device may include more wireless transceivers 240a-b, the memory 211 and a general-purpose processor 230. A multi-link device may simultaneously utilize the first wireless transceiver 240a on a first link using a first frequency band, and the second wireless transceiver 240b on a second link using a second frequency band. Additional transceivers may also be used for additional links and frequency bands and radio access technologies.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the general-purpose processor 230 and/or the DSP 231. Other configurations, however, may be used to perform baseband processing.

The UE 200 may include the sensor(s) 213 that may include, for example, an Inertial Measurement Unit (IMU) 270, one or more magnetometers 271, and/or one or more environment sensors 272. The IMU 270 may comprise one or more inertial sensors, for example, one or more accelerometers 273 (e.g., collectively responding to acceleration of the UE 200 in three dimensions) and/or one or more gyroscopes 274. The magnetometer(s) may provide measurements to determine orientation (e.g., relative to magnetic north and/or true north) that may be used for any of a variety of purposes, e.g., to support one or more compass applications. The environment sensor(s) 272 may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the general-purpose processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile. In another example, for relative positioning information, the sensors/IMU can be used to determine the angle and/or orientation of the other device with respect to the UE 200, etc.

The IMU 270 may be configured to provide measurements about a direction of motion and/or a speed of motion of the UE 200, which may be used in relative location determination. For example, the one or more accelerometers 273 and/or the one or more gyroscopes 274 of the IMU 270 may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) 273 and gyroscope(s) 274 taken after this moment in time may be used in dead reckoning to determine present location of the UE 200 based on movement (direction and distance) of the UE 200 relative to the reference location.

The magnetometer(s) 271 may determine magnetic field strengths in different directions which may be used to determine orientation of the UE 200. For example, the orientation may be used to provide a digital compass for the UE 200. The magnetometer(s) 271 may include a two-dimensional magnetometer configured to detect and provide indications of magnetic field strength in two orthogonal dimensions. Also or alternatively, the magnetometer(s) 271 may include a three-dimensional magnetometer configured to detect and provide indications of magnetic field strength in three orthogonal dimensions. The magnetometer(s) 271 may provide means for sensing a magnetic field and providing indications of the magnetic field, e.g., to the processor 210.

The transceiver 215 may include wireless transceivers 240a-b and a wired transceiver 250 configured to communicate with other devices through wireless connections and wired connections, respectively. In an example, each of the wireless transceivers 240a-b may include respective transmitters 242a-b and receivers 244a-b coupled to one or more respective antennas 246a-b for transmitting and/or receiving wireless signals 248a-b and transducing signals from the wireless signals 248a-b to wired (e.g., electrical and/or optical) signals and from wired (e.g., electrical and/or optical) signals to the wireless signals 248a-b. Thus, the transmitters 242a-b may be the same transmitter, or may include multiple transmitters that may be discrete components or combined/integrated components, and/or the receivers 244a-b may be the same receiver, or may include multiple receivers that may be discrete components or combined/integrated components. The wireless transceivers 240a-b may be configured to communicate signals (e.g., with access points and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.1 lax and 802.11be), WiFi, WiFi Direct (WiFi-D), Bluetooth®, IEEE 802.15 (UWB), Zigbee etc. The wired transceiver 250 may include a transmitter 252 and a receiver 254 configured for wired communication. The transmitter 252 may include multiple transmitters that may be discrete components or combined/integrated components, and/or the receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214. e.g., by optical and/or electrical connection. The transceiver interface 214 may be at least partially integrated with the transceiver 215.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The antenna 262 is configured to transduce the SPS signals 260 to wired signals, e.g., electrical or optical signals, and may be integrated with one or more of the antennas 246a-b. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceivers 240a-b) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position (motion) device (PMD) 219 may be configured to determine a position and possibly motion of the UE 200. For example, the PMD 219 may communicate with, and/or include some or all of, the SPS receiver 217. The PMD 219 may also or alternatively be configured to determine location of the UE 200 using terrestrial-based signals (e.g., at least some of the wireless signals 248a-b) for trilateration or multilateration, for assistance with obtaining and using the SPS signals 260, or both. The PMD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PMD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the general-purpose processor 230 and/or the DSP 231) may be configured to use to determine motion (e.g., a velocity vector and/or an acceleration vector) of the UE 200. The PMD 219 may be configured to provide indications of uncertainty and/or error in the determined position and/or motion. In an example the PMD 219 may be referred to as a Positioning Engine (PE), and may be performed by the general-purpose processor 230. For example, the PMD 219 may be a logical entity and may be integrated with the general-purpose processor 230 and the memory 211.

Figure 3A:
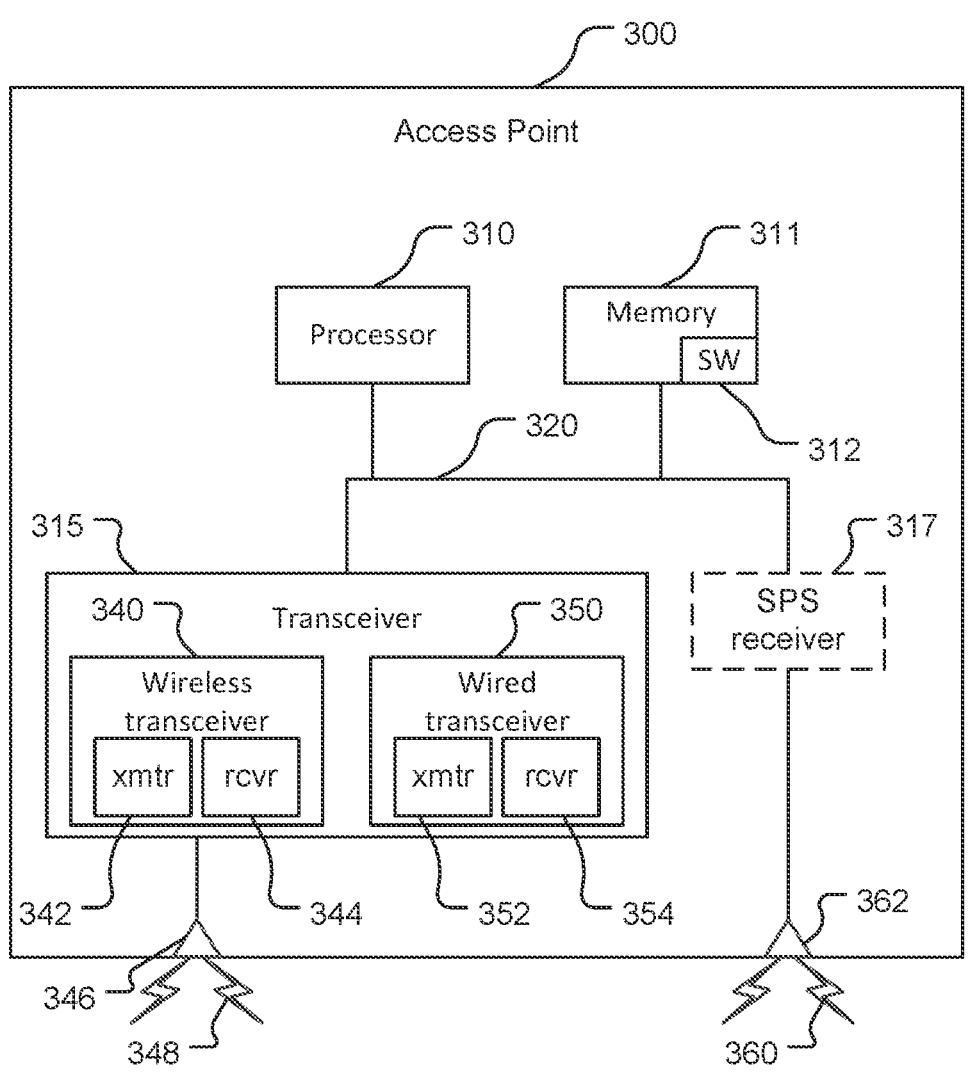
FIG. 3A is a block diagram of components of an example access point.

Referring also to FIG. 3A, an example of an access point (AP) 300 such as the AP 105 comprises a computing platform including a processor 310, memory 311 including software (SW) 312, a transceiver 315, and (optionally) an SPS receiver 317. The processor 310, the memory 311, the transceiver 315, and the SPS receiver 317 may be communicatively coupled to each other by a bus 320 (which may be configured, e.g., for optical and/or electrical communication). One or more of the shown apparatuses (e.g., a wireless interface and/or the SPS receiver 317) may be omitted from the AP 300. The SPS receiver 317 may be configured similarly to the SPS receiver 217 to be capable of receiving and acquiring SPS signals 360 via an SPS antenna 362. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions. The description may refer to the processor 310 performing a function, but this includes other implementations such as where the processor 310 executes software and/or firmware. The description may refer to the processor 310 performing a function as shorthand for one or more of the processors contained in the processor 310 performing the function. The processor 310 may include a memory with stored instructions in addition to and/or instead of the memory 311. Functionality of the processor 310 is discussed more fully below.

The transceiver 315 may include a wireless transceiver 340 and a wired transceiver 350 configured to communicate with other devices through wireless connections and wired connections, respectively. For example, the wireless transceiver 340 may include a transmitter 342 and receiver 344 coupled to one or more antennas 346 for transmitting (e.g., on one or more uplink channels) and/or receiving (e.g., on one or more downlink channels) wireless signals 348 and transducing signals from the wireless signals 348 to wired (e.g., electrical and/or optical) signals and from wired (e.g., electrical and/or optical) signals to the wireless signals 348. Thus, the transmitter 342 may include multiple transmitters that may be discrete components or combined/integrated components, and/or the receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as IEEE 802.11 (including IEEE 802.1 1ax and 802.11 be), WiFi, WiFi Direct (WiFi-D), Bluetooth®, IEEE 802.15 (UWB), Zigbee etc. The wired transceiver 350 may include a transmitter 352 and a receiver 354 configured for wired communication. The transmitter 352 may include multiple transmitters that may be discrete components or combined/integrated components, and/or the receiver 354 may include multiple receivers that may be discrete components or combined/integrated components. The wired transceiver 350 may be configured, e.g., for optical communication and/or electrical communication.

Figure 3B:
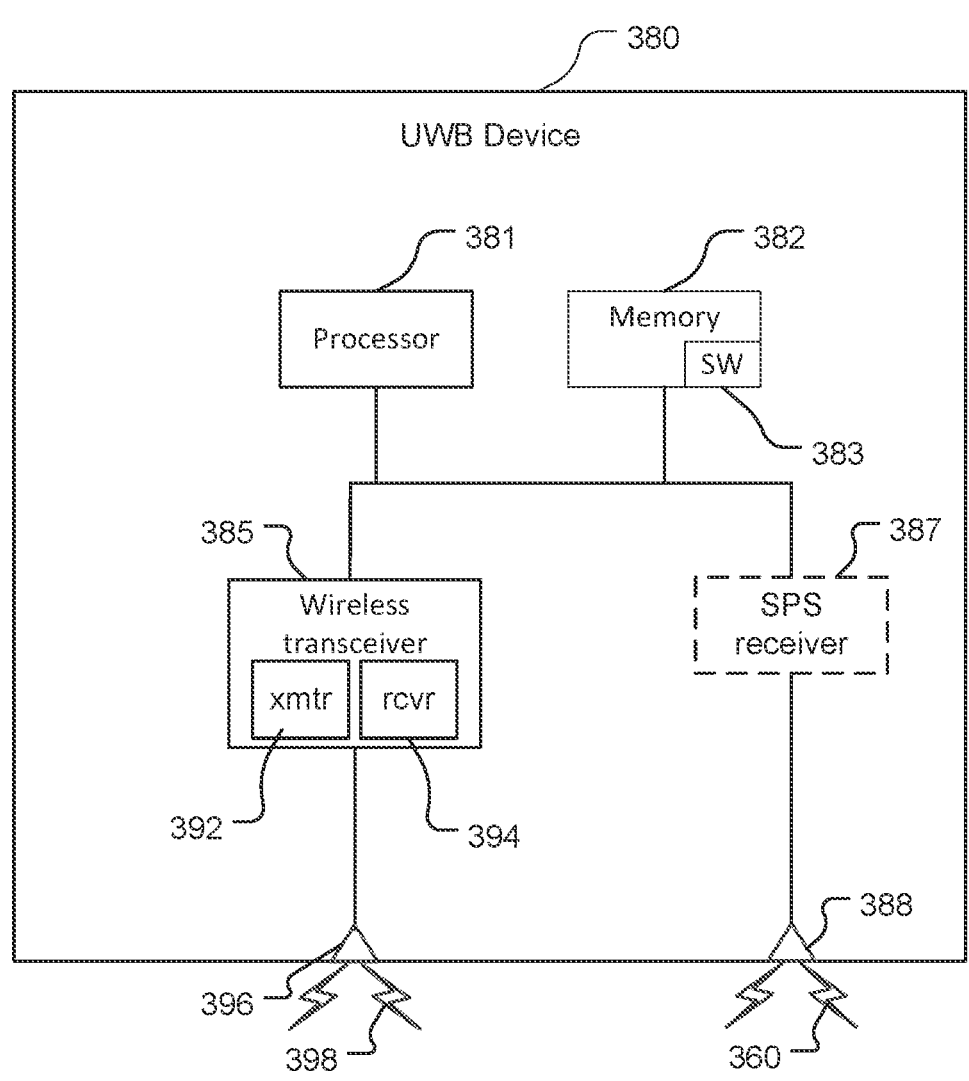
FIG. 3B is a block diagram of components of an example ultrawideband (UWB) device.

Referring also to FIG. 3B, an example of an UWB device 380 such as an asset tag, key fob, TV remote, or other mobile device configured to send and receive UWB RF transmissions. The UWB device comprises a computing platform including a processor 381, memory 382 including software (SW) 383, a wireless transceiver 385, and (optionally) an SPS receiver 387. The SPS receiver 387 may be configured similarly to the SPS receiver 217 to be capable of receiving and acquiring SPS signals 360 via an SPS antenna 388. The processor 381 may include one or more intelligent hardware devices, e.g., a central processing unit (CPU), a microcontroller, an application specific integrated circuit (ASIC), etc. The processor 381 may comprise multiple processors (e.g., including a general-purpose/application processor, a DSP, a modem processor, a video processor, and/or a sensor processor as shown in FIG. 2). The memory 382 is a non-transitory storage medium that may include random access memory (RAM)), flash memory, disc memory, and/or read-only memory (ROM), etc. The memory 382 stores the software 383 which may be processor-readable, processor-executable software code containing instructions that are configured to, when executed, cause the processor 381 to perform various functions described herein. Alternatively, the software 383 may not be directly executable by the processor 381 but may be configured to cause the processor 381, e.g., when compiled and executed, to perform the functions. The description may refer to the processor 381 performing a function, but this includes other implementations such as where the processor 381 executes software and/or firmware. The description may refer to the processor 381 performing a function as shorthand for one or more of the processors contained in the processor 381 performing the function. The processor 381 may include a memory with stored instructions in addition to and/or instead of the memory 382. Functionality of the processor 381 is discussed more fully below.

The wireless transceiver 385 is configured to communicate with other devices through wireless connections using UWB protocols. For example, the wireless transceiver 385 may include a transmitter 392 and receiver 394 coupled to one or more antennas 396 for transmitting (e.g., on one or more uplink channels) and/or receiving (e.g., on one or more downlink channels) UWB wireless signals 398 and transducing signals from the UWB wireless signals 398 to wired (e.g., electrical and/or optical) signals and from wired (e.g., electrical and/or optical) signals to the UWB wireless signals 398. In an example, the wireless transceiver 385 may include multiple transmitters that may be discrete components or combined/integrated components, and/or the receiver 394 may include multiple receivers that may be discrete components or combined/integrated components. In an example, the wireless transceiver 385 may be configured to communicate signals according to a variety of radio access technologies (RATs) in addition to UWB technologies. For example, the wireless transceiver 385 may be also configured to utilize RATs such as IEEE 802.11 (including IEEE 802.11ax and 802.11be), WiFi, WiFi Direct (WiFi-D), Bluetooth®, IEEE 802.15 (UWB), Zigbee etc.

Figure 4A:
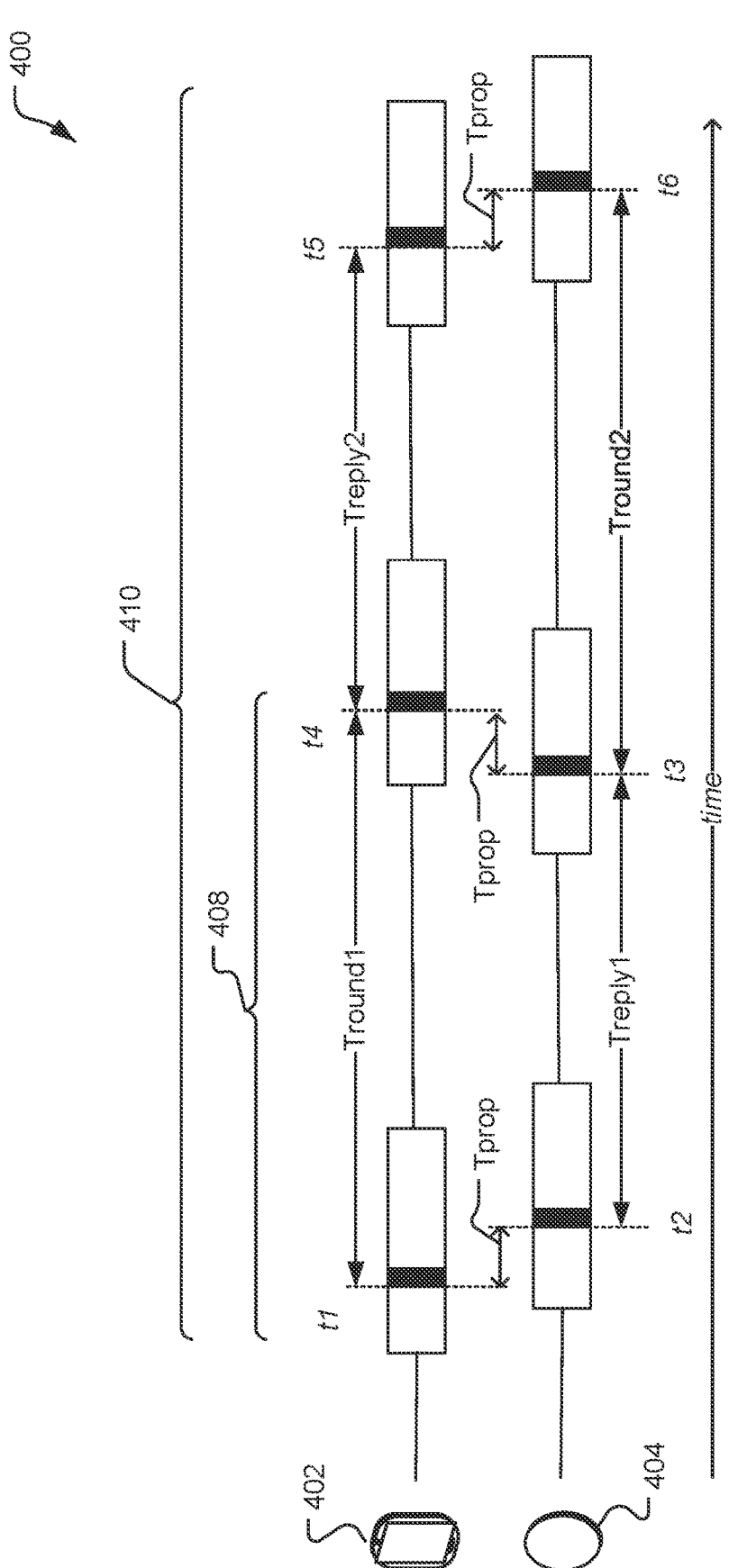
FIG. 4A is a diagram of example signal exchanges for ultrawideband (UWB) ranging.

Referring to FIG. 4A, a diagram 400 of example signal exchanges for UWB ranging is shown. The diagram 400 includes a first UWB device 402 (e.g., a smartphone) and a second UWB device 404 (e.g., an asset tracker). The UWB devices 402, 404 may include some or all of the components of the UE 200 and/or the UWB device 380. The UE 200 is an example of the first UWB device, and the UWB device 380 is an example of the second UWB device 404. Each of the UWB devices 402, 404 includes one or more transceivers configured to send and receive UWB signals. The signal exchanges may be based in the IEEE 802.15.4 standard and may utilize the physical layer (PHY) and media access control (MAC) sublayers to enable secure ranging. UWB devices may utilize a 2 ns pulse, which reduces the threat of relay attacks. The positioning exchanges may also utilize IEEE 802.15.4z security features such as Scrambled Time Sequences (STS) in the UWB ranging frame to prevent preamble insertion attacks. In a first example, the UWB signals comprise a single-sided two-way ranging exchange 408 such that the first UWB device 402 transmits a ranging marker at time t1 which is received by the second UWB device 404 at time t2. The second UWB device 404 sends an acknowledgement frame at time t3, which is received by the first UWB device at time t4. A first round time (Tround1) is equal to t4–t1, and a first reply time (Treply1) is equal to t3–t1. The second UWB device 404 may be configured to provide the Treply1 time to the first UWB device 402. The first UWB device 402 may compute a first round trip propagation time:

$$Tprop1=Tround1-Treply1 \tag{1}$$

The distance between the first UWB device 402 and the second UWB device 404 is equal to:

$$distance=c*(Tprop1/2) \tag{2}$$

where c=the speed of light.

In a second example, the signals comprise a double-sided two-way ranging exchange 410 such that the first UWB device 402 will also transmit an acknowledgment at time t5 which is received by the second UWB device 404 at time t6. The first UWB device 402 may provide a second reply time (Treply2) (i.e., t5–t4) to the second UWB device 404. The Tprop time may be computed as:

$$Tprop=((Tround1*Tround2)-(Treply1*Treply2))/ \\ (Tround1+Tround2-Treply1-Treply2) \tag{3}$$

The propagation times (i.e., Tprop) represent the time-of-flight (ToF) of the respective signals between the UWB devices 402, 404 and may be used to determine the distance between the UWB devices 402, 404. In operation, a UWB device may be configured to determine distances up to 100 m with an accuracy of approximately +/−10 cm.

Figure 4B:
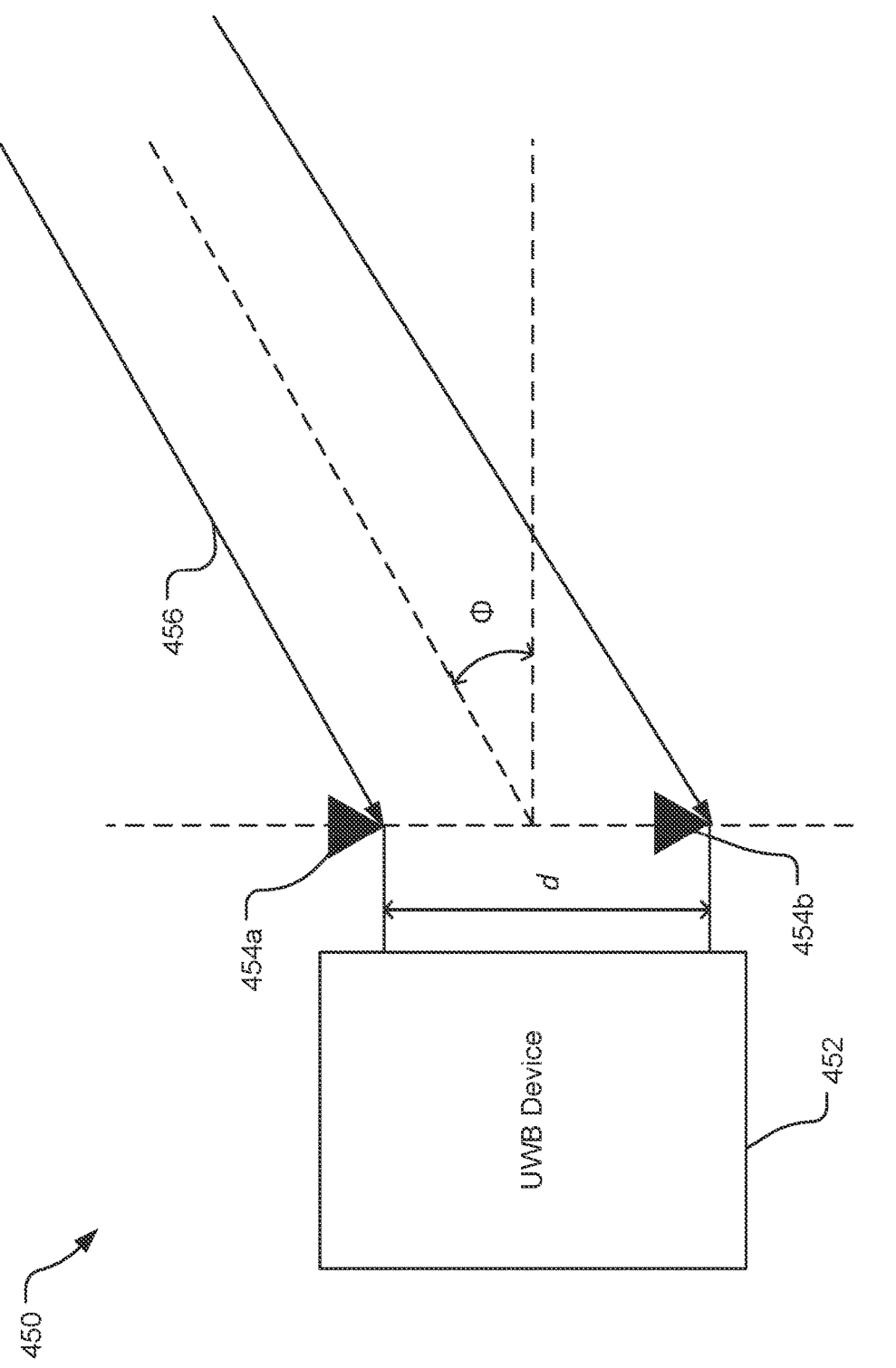
FIG. 4B is a diagram of an example angle of arrival of a UWB signal.

Referring to FIG. 4B, a diagram 450 of an example angle of arrival of a UWB signal is shown. The diagram 450 includes a UWB device 452 (e.g., the first UWB device 402 or the second UWB device 404) with a plurality of antennas 454a, 454b in an antenna array. A UWB signal 456 is detected at an angle of arrival (AoA) Φ by the antenna array. In general, the AoA is based on a time difference between the arrival of the UWB signal 456 at each of the antennas 454a, 454b in the antenna array. The time delay between the arrival of the signals may be determined as:

$$t=d*sin \Phi/c \tag{4}$$

where, t is the time delay;

d is the distance between the antennas;

Φ is the AoA; and c is the speed of light.

In operation, the UWB device may be configured to determine an AoA with an accuracy of approximately of +/−1.5 degrees.

Figure 5:
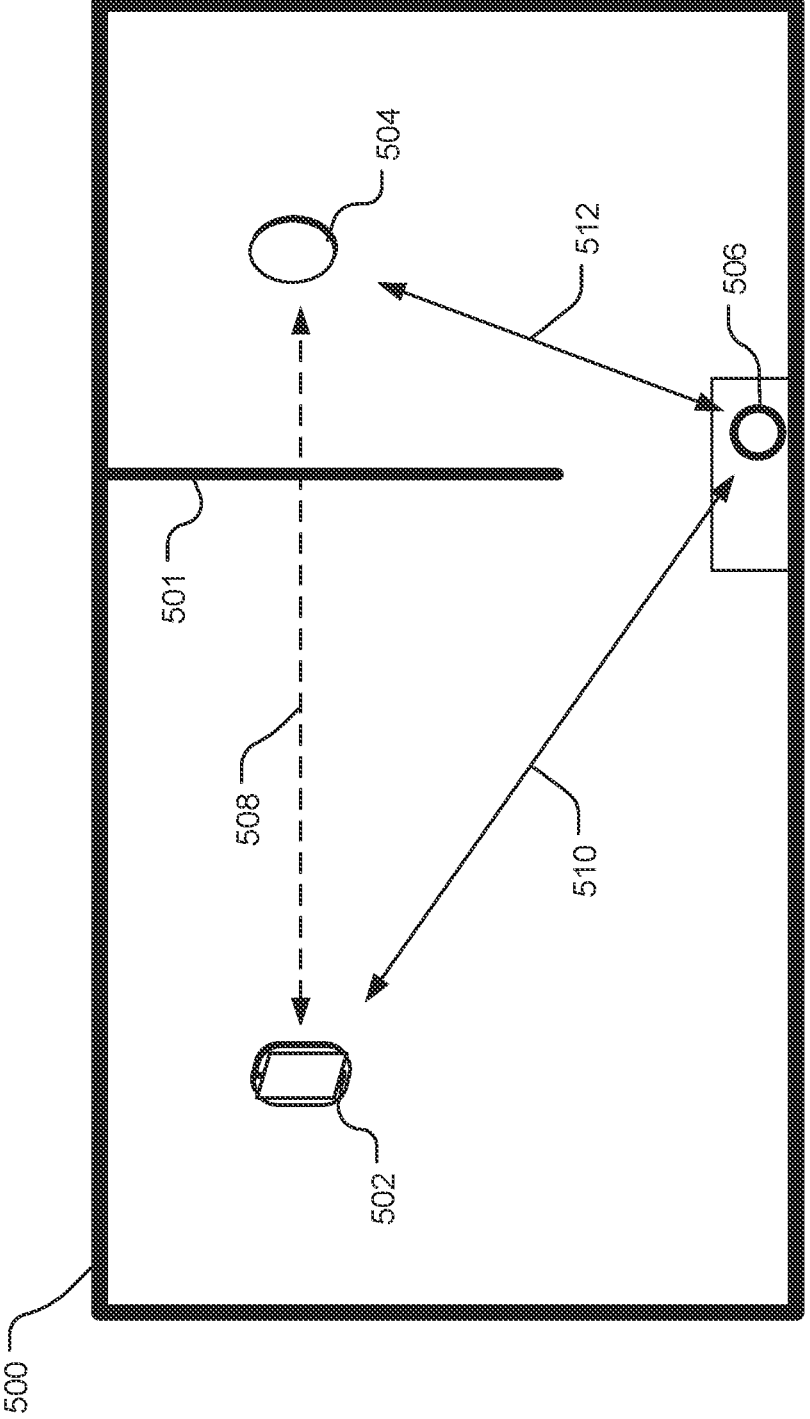
FIG. 5 is an example asset tracking use case with networked UWB devices.

Referring to FIG. 5, an example asset tracking use case with networked UWB devices is shown. An indoor area 500 may, include multiple UWB capable devices configured to communicate with one another. For example, a UE 502 may be configured to communicate with an asset tag 504 and a smart speaker 506. These devices are examples, and not limitations, as other devices such as IoT devices, computers, appliances, tablets, smart watches, etc. may also be UWB capable and configured to communicate with one another. Other devices in the WLAN network 100, such as the AP 105, may be UWB capable devices. In an example, the target devices may include routers and small cellular transceivers. The asset tag 504 may include some or all of the components of the UWB device 380. In an example, the asset tag 504 may be a small UWB capable device affixed to a portable object a user may wish to locate without undue searching such as a set of keys, a purse, eye-glasses case, etc. The asset tag 504 may also be a UWB device within other objects such as a television remote, an automobile key fob, a tablet computer, etc. In operation, UWB signals typically utilize frequencies in the range of 3.1 to 10.6 GHz which may be attenuated by architectural and temporary barriers which are disposed in the line-of-sight (LOS) between the communicating devices. For example, a barrier 501 such as a wall may reduce the quality of a positioning exchange 508 between the UE 502 and the asset tag 504. The barrier 501 may prevent the UE 502 and the asset tag 504 from communicating and/or may reduce the quality of range and AoA measurements based on the positioning exchange 508. In such circumstances, a UWB capable bridging device such as the smart speaker 506 may have LOS with both the UE 502 and the asset tag 504 and may be configured to provide relative position information to each of the devices. For example, the smart speaker 506 may determine a range (e.g., based on ToF measurements described in FIG. 4A) and a bearing (e.g., based on the AoA as described in FIG. 4B) to the asset tag 504 based on a first message exchange 512. The UE 502 may determine the relative location (e.g., range and bearing) of the smart speaker 506 via a second message exchange 510. The UE 502 may also obtain the position information (e.g., range and bearing) associated with the asset tag 504 from the smart speaker 506 (e.g., based on the first message exchange 512). The UE 502 may utilize the two relative position measurements to obtain a relative location of the asset tag 504.

In an example, the UE 502 may attempt to obtain multiple positioning measurements with the asset tag 504 to determine a quality of the resulting position estimate. The presence of the barrier 501 may cause an increase in the variation of the individual range and bearing estimates. The UE 502 may also make multiple attempts to determine the location of the asset tag 504 via one or more bridging devices. The UE 502 may compare the position estimates for the asset tag 504 obtained using both techniques (e.g., direct measurements, or via bridging devices) and select the more accurate position estimate (e.g., with the lower measurement variance).

In operation, when an initiating device, such as the UE 502, attempts to locate a target device, such as the asset tag 504, that is outside of the initiating device's position range or the positioning does not meet the expected accuracy (e.g., the initiating device and the target device are not within LOS of one another, which can be determined by channel estimation), the initiating device may be configured to broadcast a location request to nearby UWB devices (e.g., the smart speaker 506). The initiating device may estimate the relative position(s) of the nearby UWB device(s) and the respective accuracy. If a nearby device (e.g., the smart speaker 506 in this example) can locate the target device (e.g., the asset tag 504) with adequate accuracy (e.g., based on an established threshold value), the nearby device may be configured to report position information (e.g., range, bearing, accuracy) for the target device to the initiating device. The initiating device may be configured to calculate a position for the target device based on the position information reported by the nearby "bridge" device. The initiating device may also be configured to compare the direct positioning result vs the indirect results via the bridge devices and make a final decision on a position estimate for the target device. In an example, if the nearby bridge devices are unable to locate the target device, they may be configured to pass the location request received from the initiating device to their respective nearby devices. The initiating device may evaluate the position and accuracy information for each of the bridge devices and select a path with the more accurate results (e.g., the least position error). The process of selecting bridge device combinations may continue until the total estimated position error is within an established error threshold.

Figure 6A:
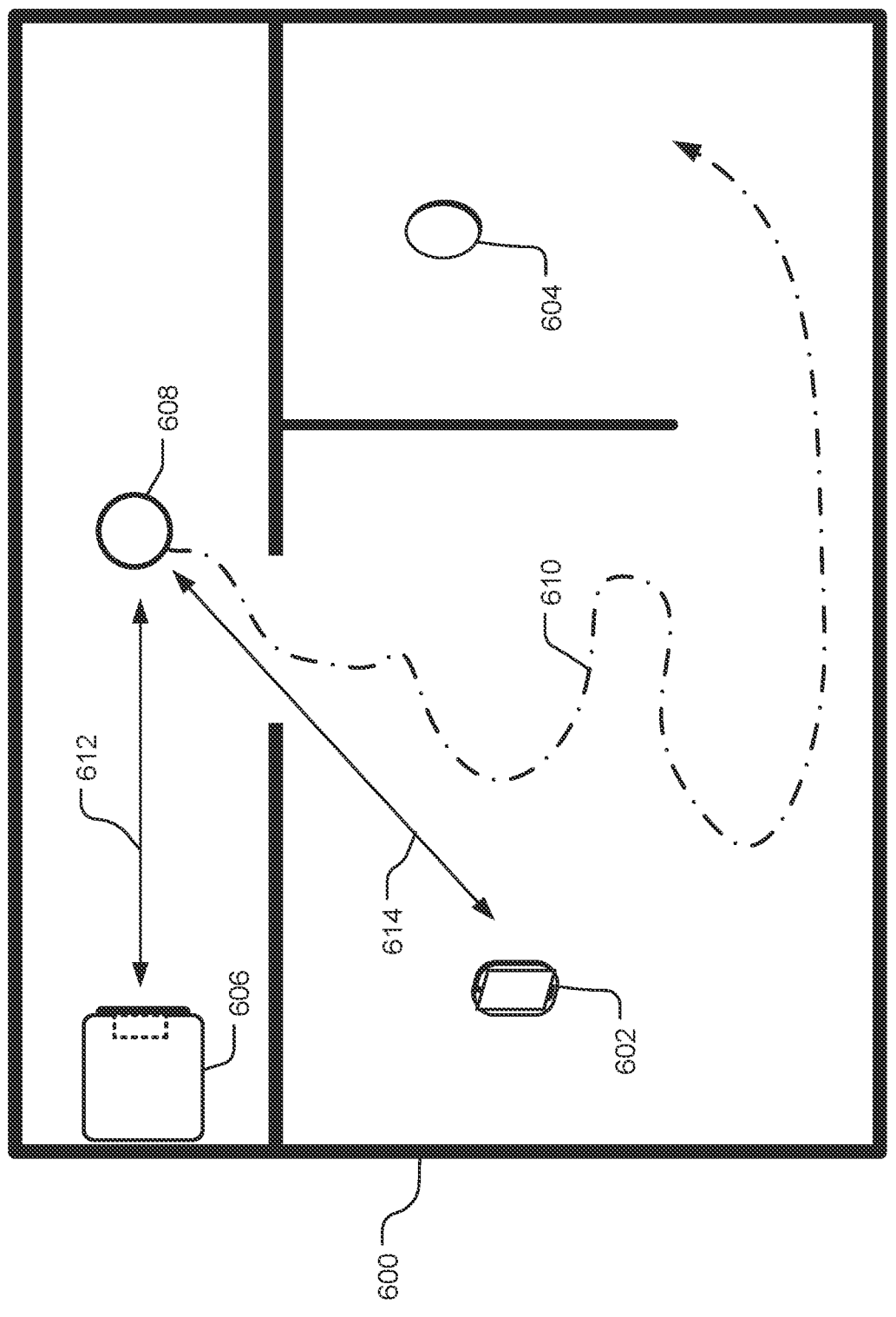
FIGS. 6A and 6B depict an example asset tracking use case with a mobile device.
Figure 6B:
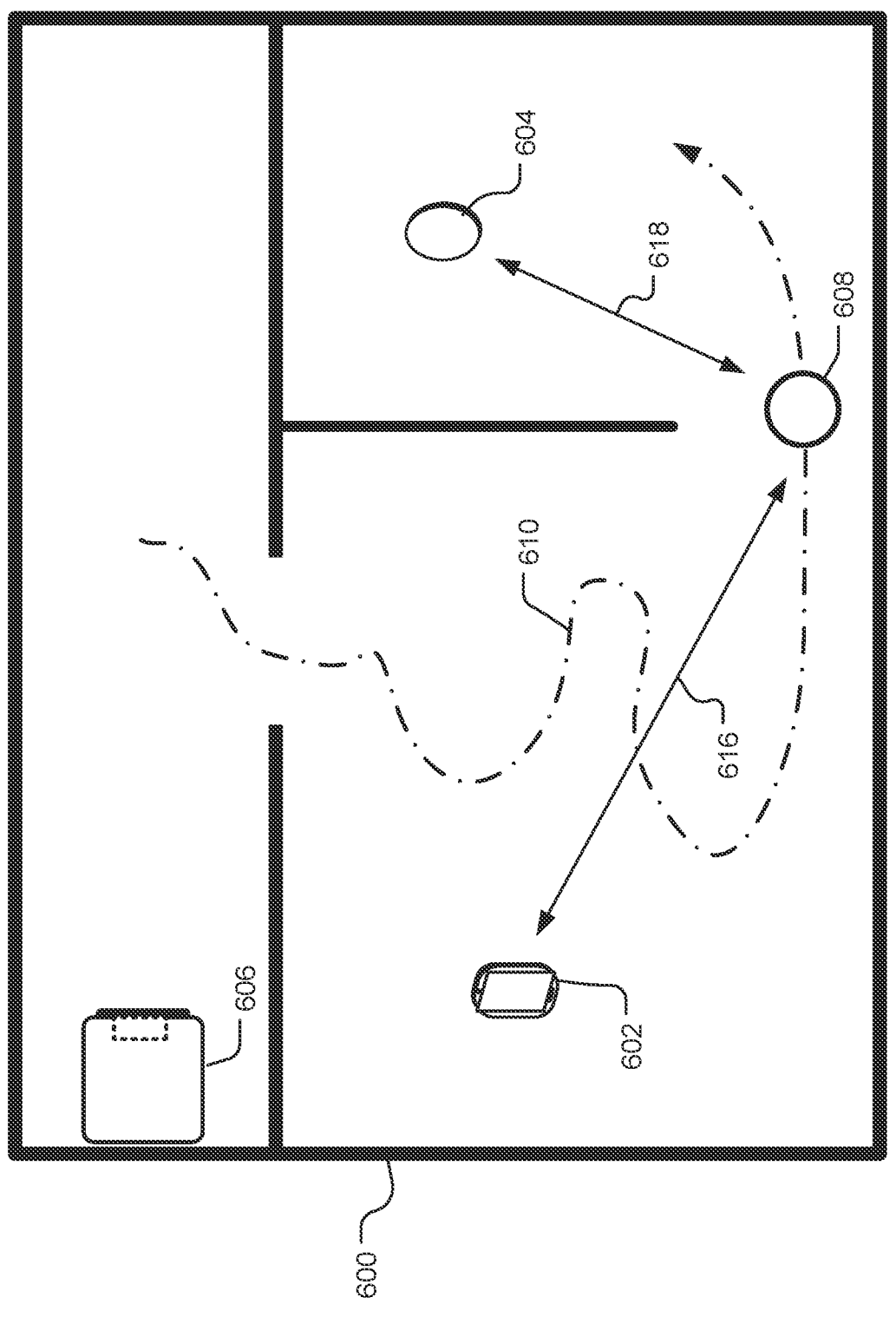

Referring to FIGS. 6A and 6B, an example asset tracking use case with a mobile device is shown. An indoor area 600 may include a plurality of UWB capable devices such as a UE 602, an asset tag 604, a IoT appliance 606 (e.g., refrigerator, oven, washer/dryer, etc.), and a mobile device 608 (e.g., robot vacuum, robot dog, drone, humanoid robot, a UE in a person's pocket, etc.) configured to move within the indoor area 600, such as along a trajectory 610. The UWB capable devices 602, 604, 606, 608 may have some or all of the components of the UWB device 380 and/or the UE 200. In operation, the mobile device 608 may be configured to communicate with other UWB capable devices as it proceeds along the trajectory 610. The mobile device 608 may be used as a bridge device to establish the relative position of the UWB devices in the area 600. For example, the mobile device 608 may be used to determine the relative positions of the UE 602 and the IoT appliance 606 via a first positioning message exchange 612 and a second positioning message exchange 614. In an example, the IoT appliance 606 may be an anchor device with a known coordinate location (e.g., lat/long/alt) and the positioning message exchanges 612, 614 may be used to determine a coordinate location of the UE 602. Referring to FIG. 6B, as the mobile device 608 proceeds along the trajectory 610 it may utilize a third positioning message exchange 616 and a fourth positioning message exchange 618 to determine the relative locations of the UE 602 and the asset tag 604. The mobile device 608 may be configured to store device position information such as range and bearing with timestamps as it moves about the indoor area 600. For example, the mobile device 608 may periodically (e.g., 100 ms, 500 ms, 1 sec, etc.) obtain position information for the other UWB devices and store the position information in a local or remote (e.g., networked) memory device. Thus, the IoT appliance 606 may obtain position information associated with the asset tag 604 based on the position information associated with the UE 602, or the position information associated with other UWB devices the mobile device 608 has obtained. For example, the IoT appliance 606 may utilize the positioning information obtained in the first, second, third and fourth positioning message exchanges 612, 614, 616, 618 to determine the relative position of the asset tag 604.

In an example, other mobile UWB devices such as UEs may be held at different locations in the area 600 (e.g., doors, windows, stairs) which have line-of-sights to different UWB devices (e.g. fixed UWB anchors, smart speakers, TVs, TV remotes, etc.). The process may be initiated by a mobile device when different UWB devices are detected. The mobile device may be held in different orientations (e.g., vertical w.r.t. to ground) such that the relative position and orientations may provide improved 3D positioning info to UWB devices at different floor levels. In an example, a mobile UWB device may include height sensors (e.g., barometer, etc.) which may be configured to provide 3D and height information. Multiple mobile UWB devices may be disposed at different locations as line-of-sight bridges for a network of UWB devices to improve the relative position accuracy of the UWB devices. Calibration and/or set-up modes may be executed when some UWB devices are added, removed, or relocated. The increased number of different measurement locations and orientations of the mobile device 608 may be used to improve the location estimates of the nearby UWB devices. The mobile device 608 may then propagate the location estimates to other UWB devices in the network as it moves throughout the indoor area 600.

Figure 7:
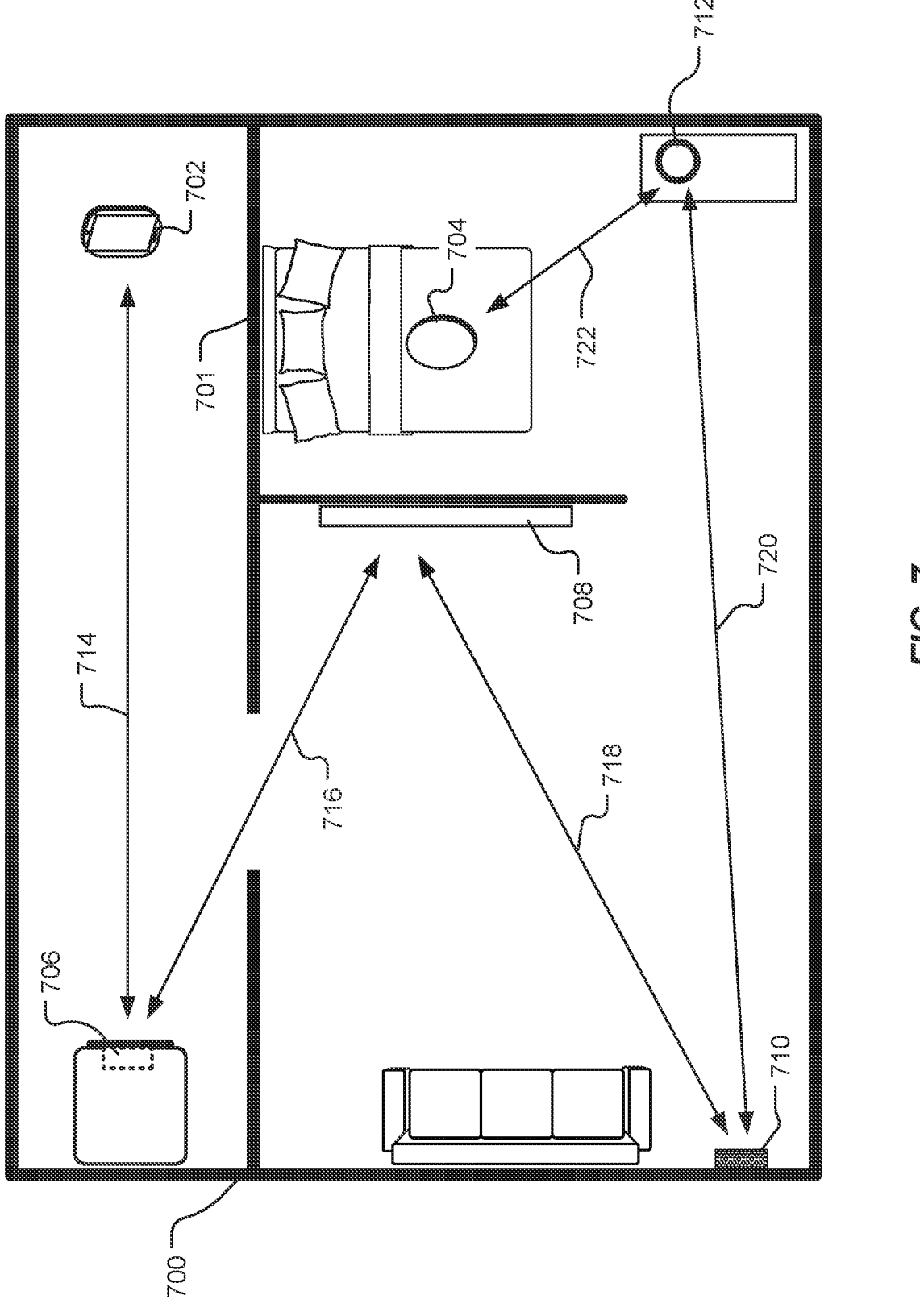
FIG. 7 is an example asset tracking use case with a plurality of bridge devices.

Referring to FIG. 7, an example asset tracking use case with a plurality of bridge devices is shown. An indoor area 700 may include a plurality of UWB capable devices disposed in different rooms and around different barriers. The UWB capable devices include a UE 702, an asset tag 704, an IoT appliance 706, a smart TV 708, a smart outlet 710, and a smart speaker 712. The UWB capable devices in the area 700 are examples, and not limitations, as other UWB capable devices may be included. In an example, the UE 702 may attempt to locate the asset tag 704 but the presence of a barrier 701 (e.g., load bearing wall) may attenuate or otherwise block any UWB signals transmitted between the UE 702 and the asset tag 704. If the position of the asset tag 704 cannot be accurately established due to the signal attenuation, then the UE 702 may be configured to transmit a query to obtain position information associated with the asset tag 704 to the other UWB devices. For example, the UE 702 may perform a first message exchange 714 with the IoT appliance 706 to request the position information associated with the asset tag 704, and to determine a range and bearing to the IoT appliance 706. The IoT appliance 706 may perform a second message exchange 716 with the smart TV 708 to request position information associated with the asset tag 704. The second message exchange 716 may also be used to determine a range and bearing to the IoT appliance 706 if it was not previously known (e.g., both the IoT appliance 706 and the smart TV 708 may be in fixed locations and the relative locations may have been previously determined and stored in local memory). The smart TV 708 may perform a third message exchange 718 with the smart outlet 710 to request position information associated with the asset tag 704, and to determine a range and bearing to the smart outlet 710 if required. The smart outlet 710 may perform a fourth message exchange 720 with the smart speaker 712 to request position information associated with the asset tag 704. The smart speaker 712 may determine a range and bearing to the asset tag 704 via a fifth message exchange 722. The smart speaker 712 may then provide the location information associated with the asset tag 704 (e.g., range, bearing, error information) to the smart outlet 710, which may then provide location information to the smart TV 708, which may then provide location information to the IoT appliance 706, which may then provide location information to the UE 702. The IoT appliance 706, the smart TV 708, the smart outlet 710 and the smart speaker 712 perform as bridging devices to provide the location information associated with the asset tag 704 as well as their respective location information (e.g., the relative locations to one another) to the UE 702 to enable the UE 702 to determine the location of the asset tag 704. In an example, the message exchanges 716, 718, 720, 722 may be performed serially in response to a request from the UE 702. In an example, the message exchanges 716, 718, 720, 722 may be performed asynchronously such that each UWB device may obtain location information for other UWB devices periodically and/or based on detecting a new signal. The location information may be stored locally or on a network server and provided in response to a request from the UE 702.

Figure 8:
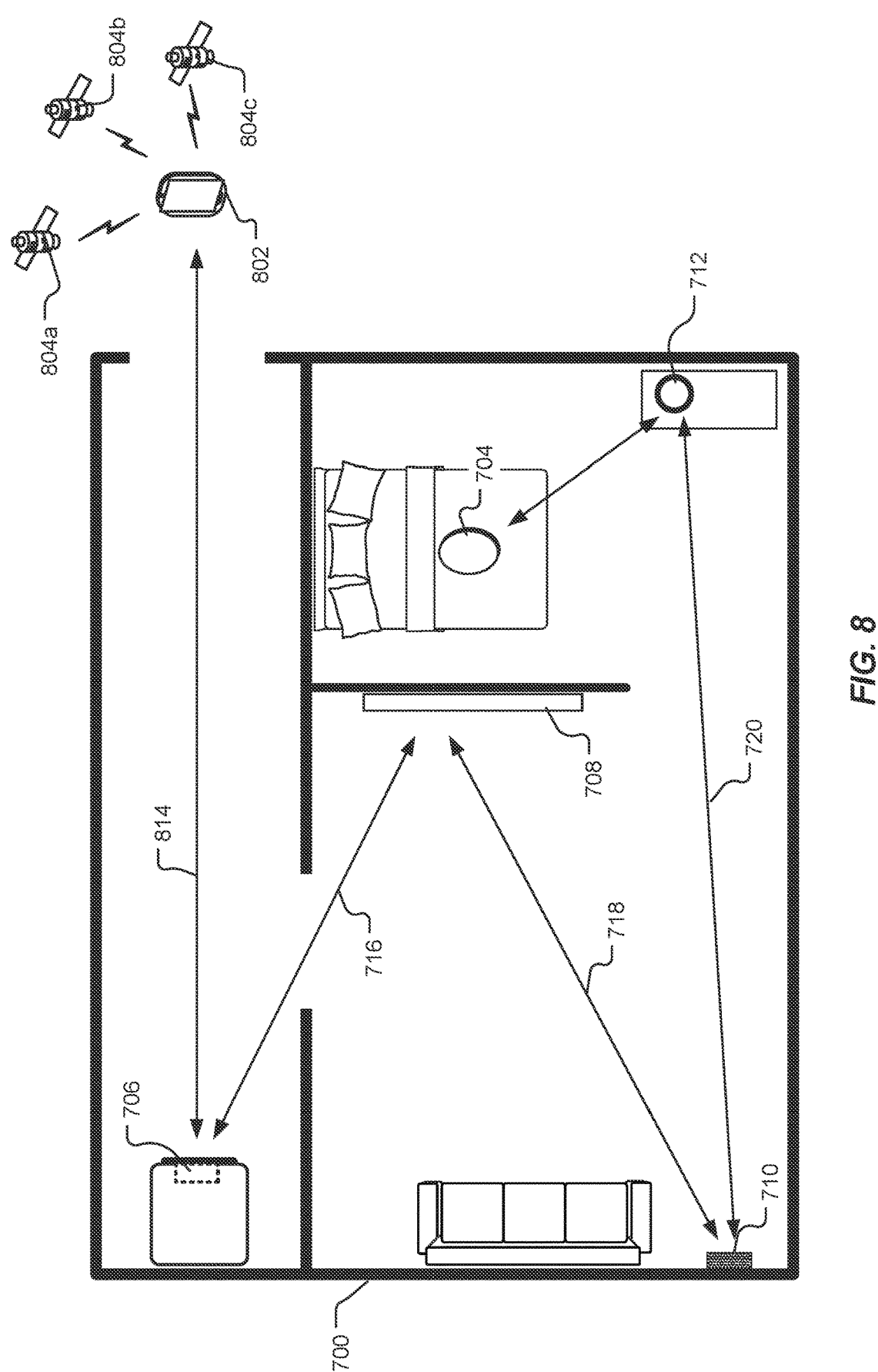
FIG. 8 is an example asset tracking use case with an anchor device.

Referring to FIG. 8, with further reference to FIG. 7, an example asset tracking use case with an anchor device is shown. In an example, a UE 802 may be located outside of the indoor area 700 but may have a LOS path to one or more UWB capable devices located inside of the area 700. For example, the LOS path may utilize a door, a window, or other structural feature which will enable the UWB devices to exchange messages. In an example, the UE 802 may utilize positioning signals from a plurality of GNSS satellites 804*a-c* to determine an absolute position based on geographic coordinates (e.g., lat/long/alt). The absolute position may also be obtained based on terrestrial positioning techniques utilizing cellular and/or WiFi transceivers (e.g., multilateration based on RTT, RSTD, AoA, and other positioning measurements). The UE 802 may utilize a message exchange 814 with the IoT appliance 706 to provide geographic coordinates and to determine the relative positions of the UE 802 and the IoT appliance 706. The other UWB devices in the area 700 may utilize their respective relative position information as described in FIG. 7 in combination with the geographic coordinates of the UE 802 (e.g., an anchor UE) to compute their respective absolute geographic coordinates.

In an example, after the relative positioning of the UWB devices (e.g., 702, 802, 704, 706, 708, 710, 712) are determined, the UWB devices may be configured to store/persist the relative or absolute location of other devices in a data structure. Each UWB device may include a data structure with location information for neighboring devices. In an example, the data structure may persist on a network server configured to communicate with the UWB devices. The UWB devices may be configured to propagate the location information to neighboring devices. This data may be used to generate a map of the UWB devices in an area. Since the locations of some UWB devices may change over time, the location information in the data structure may be updated. For example, some UWB devices may include sensors to detect movement (e.g., accelerometers, gyroscopes, etc.) and may be configured to broadcast and indication of a movement (e.g., a potential location change) to other UWB devices to enable the UWB devices to update the data structure. In an example, the other UWB devices may periodically perform positioning message exchanges to detect a change in location of a UWB device and then update location information associated with the UWB device. When new UWB devices are added to an area, the new UWB devices and nearby existing UWB devices may exchange position information, update and broadcast the location information in their respective data structures.

Figure 9:
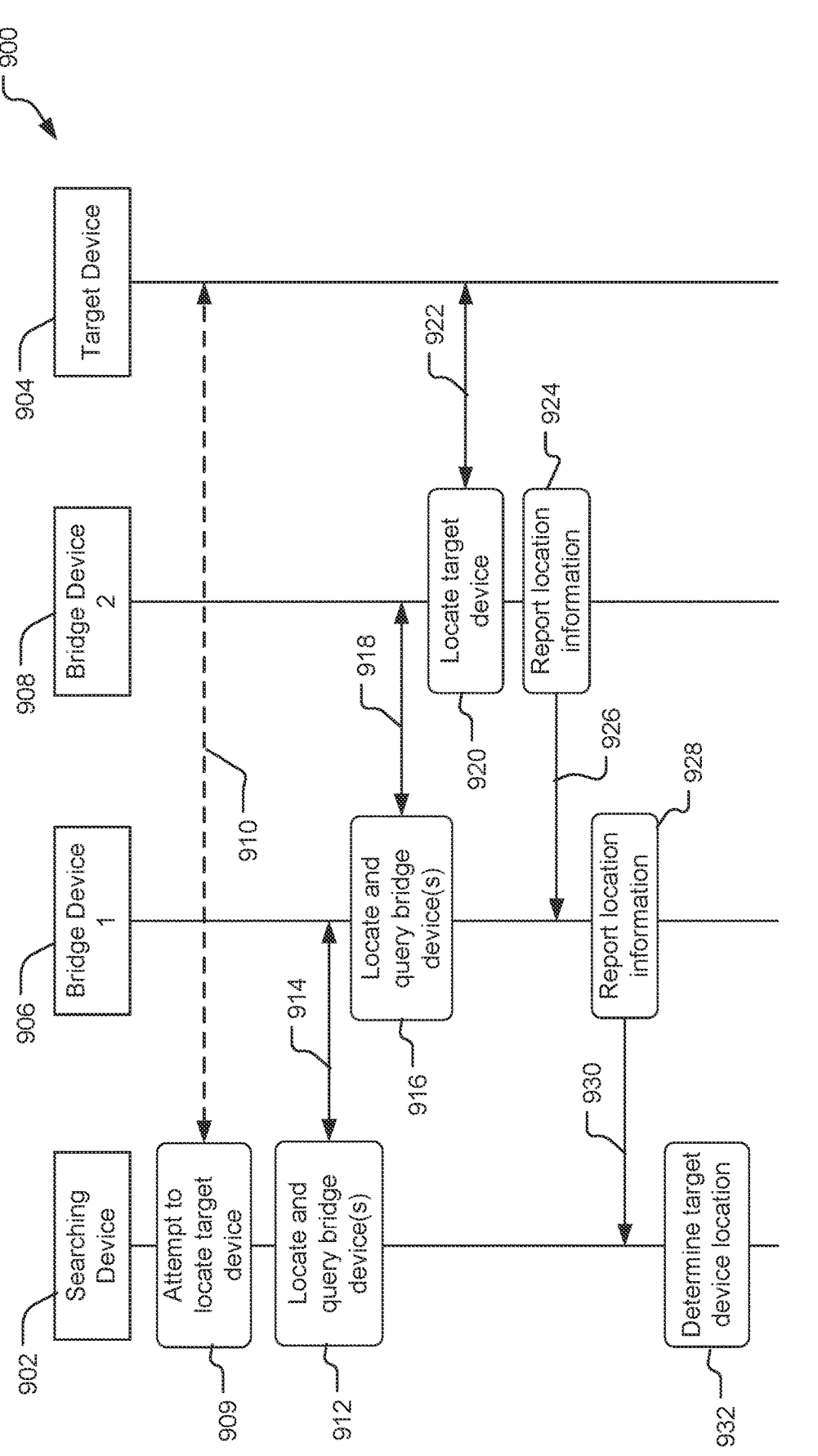
FIG. 9 is an example message flow for determining a target device location with a plurality of bridge devices.

Referring to FIG. 9, an example message flow 900 for determining a target device location with a plurality of bridge devices is shown. The message flow 900 includes a searching device 902, a target device 904, and a plurality of bridge devices including a first bridge device 906 and a second bridge device 908. The number of bridge devices is an example and not a limitation as fewer or additional bridge devices may be used. Each of the devices 902, 904, 906, 908 are configured to transmit and receive UWB signals as described herein. In an example, the devices 902, 904, 906, 908 may include some or all of the components of the UE 200 and/or the UWB device 380. The message flow 900 may be utilized, for example, in the asset tracking use case described in FIG. 7. At stage 909, the searching device may attempt to locate the target device 904 by transmitting one or more UWB ranging signals 910 such as described in FIG. 4A. The distance between the searching and target devices 902, 904, and/or any barriers which may attenuate the signals transmitted between the devices, may prohibit or degrade the range and AoA measurements obtained by the searching device 902. For example, the weak signals received by the searching device 902 may cause an inaccurate position estimate based on the increase in the variance of the range and AoA measurements for the UWB ranging signals 910. At stage 912, the searching device 902 may search for other UWB capable devices, such as the first bridge device 906. The searching device 902 and the first bridge device 906 may exchange UWB ranging and position information messages 914 to establish the respective relative positions of the devices 902, 906, and position information associated with the target device 904. For example, the first bridge device 906 may be in communication with the target device 904 or may have previously determined a position of the target device 904 and may provide the position information associated with the target device 904 to the searching device 902. In an example, at stage 916, the first bridge device 906 may also be configured to exchange UWB ranging and position information messages 918 to forward the query received from the searching device 902 to one or more other bridge devices, such as the second bridge device 908.

In an example, the first bridge device 906 may exchange UWB ranging and position information messages 918 with the second bridge device 908 to obtain position information associated with the target device 904. In an example, at stage 920, the second bridge device 908 is in communication with the target device 904 and may exchange UWB ranging messages 922 with the target device 904. At stage 924, the second bridge device 908 may provide position information associated with the target device 904 (e.g., range and bearing) to the first bridge device 906 in one or more position information reports 926. At stage 928, the first bridge device 906 may forward the position information associated with the target device 904 as well as the position information associated with the second bridge device 908 (e.g., range and bearing to the second bridge device 908 from the first bridge device 906) in one or more position information reports 930. At stage 932, the searching device 902 is configured to use the position information associated with the bridge devices 906, 908 and the target device 904 to determine the range and bearing to the target device 904 from the searching device 902. For example, cartesian and/or polar vector addition techniques may be used to determine the bearing and range to the target device based on the relative positions of the bridge devices 906, 908. In an example, the location information may include interference information detected by the reporting device. A reporting device may detect radio frequency interference on one or more channels and may be configured to report the presence of the interference to other devices in the network based on the message flow 900. Other network information may also be reported based on the message flow 900. Thus, the devices in a network may be configured to share interference and/or other important information with other UWB devices in the network. In an example, the location information and interference information may be used to identify an approximate location of a source of the interference.

While the messages in the message flow 900 are depicted in sequential order, the position information associated with the bridge devices 906, 908 and the target device 904 may be obtained prior to receiving a request from a searching device. For example, the bridge devices 906, 908 may be configured to maintain a data structure (e.g., map) of the UWB devices in a network based on periodic ranging and reporting messages with neighboring stations. The ranging and reporting messages may be triggered when devices are added, removed, or relocated in the network. The target device 904 is not limited to portable devices such as asset tags, user equipment and other such portable transceivers. In an example, the target device 904 may be other components of a network such as routers or small cellular transceivers (e.g., pico or femto cells). The locations of such network components may be obtained based on the UWB positioning techniques provided herein and may reduce the costs and complexity of the network components by reducing the need for on-board GPS receivers, and/or enabling indoor position estimates when GPS signals cannot be reliably received. Thus, new components may be added and mapped in a network without relying on receiving and/or processing GPS signals.

Figure 10:
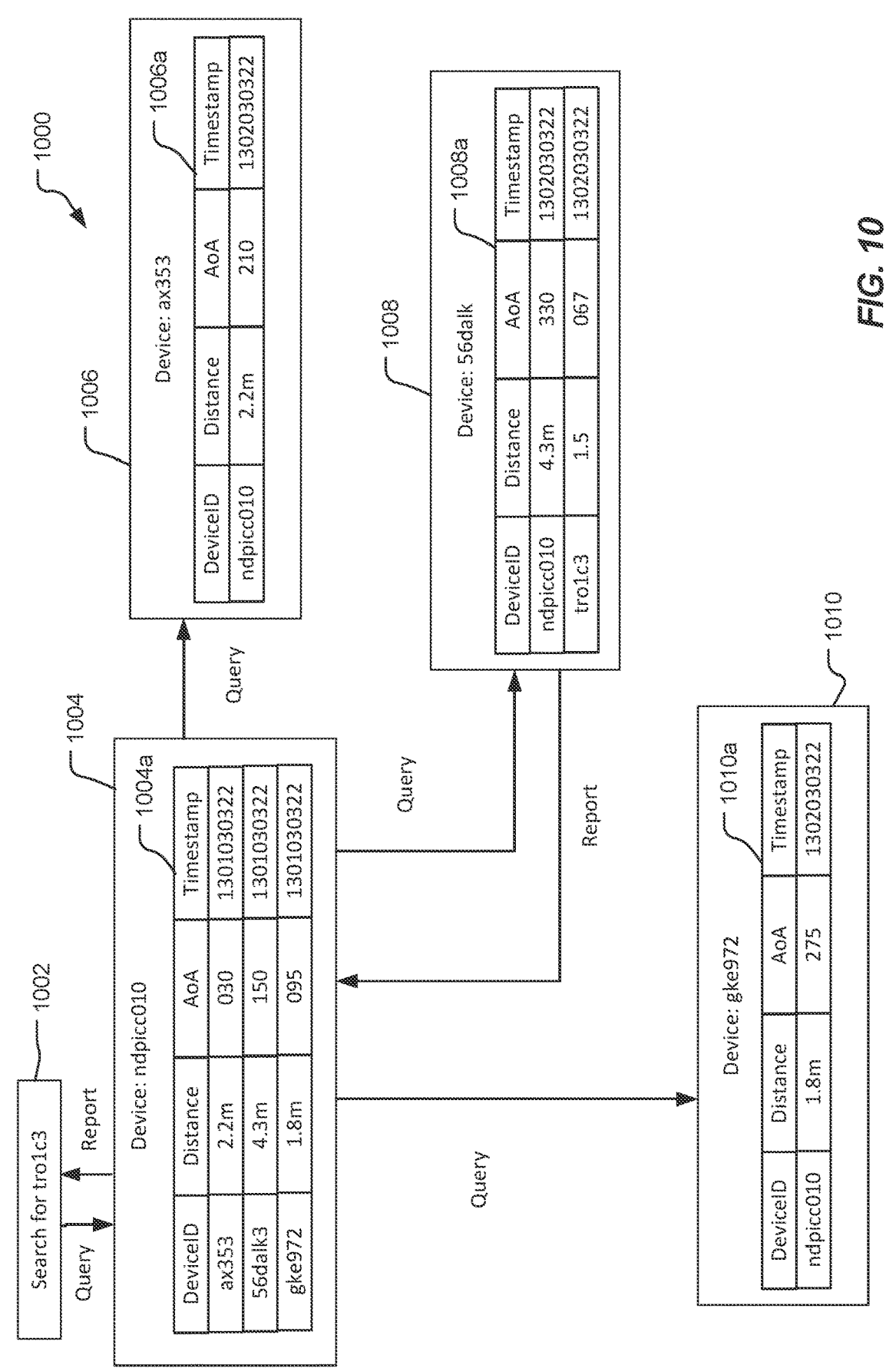
FIG. 10 is an example data structure for determining the location of a target device with one or more bridge devices.

Referring to FIG. 10, and example data structure 1000 for determining a location of a target device with one or more bridge devices is shown. In an example, the data structure 1000 may include a plurality of data tables stored on different UWB capable devices, such as the devices described in FIG. 7. For example, the data tables may be stored in the memory 382 of the respective UWB devices. Each of the data tables includes fields such as a deviceID field, a distance field, an AoA field, and a timestamp field to characterize the relative positions of neighboring UWB devices. The data tables in the data structure 1000 are examples, and not limitations as other data fields may be included or substituted for the fields depicted in FIG. 10. The deviceID field may be a unique identification associated with a UWB device, and the distance, AoA and timestamp fields may indicate the bearing and range to the device and the time the measurements were obtained. For example, a first device 1004 includes data associated with three neighboring devices, including a second device 1006, a third device 1008, and a fourth device 1010. The first device 1004 may receive a query 1002 for a target device (e.g., for location information associated with deviceID 'tro1c3') from a searching device (not shown in FIG. 10). The first device 1004 may search an internal table 1004a to determine if position information for the target device is available. In the example, the first device 1004 does not have position information for the target device and will send one or more query messages to the second, third and fourth devices 1006, 1008, 1010. The second device 1006 and the fourth device 1010 do not have location information associated with the target device stored in their respective internal tables 1006a, 1010a and may send null responses (or no responses) to the query. In an example, the second device 1006 and the fourth device 1010 may perform a search function and/or send queries to neighbor UWB devices to obtain location information for the target device. The third device 1008 includes location information for the target device in an internal table 1008a and may report the location information (e.g., distance, AoA, timestamp) to the first device 1004. The first device 1004 may then forward location information associated with the third device 1008 and the target device (i.e., based on the report received from the third device 1008) to the searching device. In an example, the first device 1004 may determine a range a bearing to the target device (i.e., based on the location of the third device 1008 and the location information associated with the target device obtained by the third device 1008) and append the internal table 1004a with the location for the target device (i.e., based on the relative location of the target device to the first device 1004). The fields described in the internal tables 1004a. 1006a, 1008a, 1010a are examples. Other fields such as timing information (e.g., ToF value, signal strength, AoD, orientation, uncertainty/accuracy, etc.) may also be stored and reported. Additional information, such as channel interference information, may also be included as fields in the tables 1004a. 1006a, 1008a, 1010a. The interference information may thus be shared with other UWB devices in the network.

Figure 11:
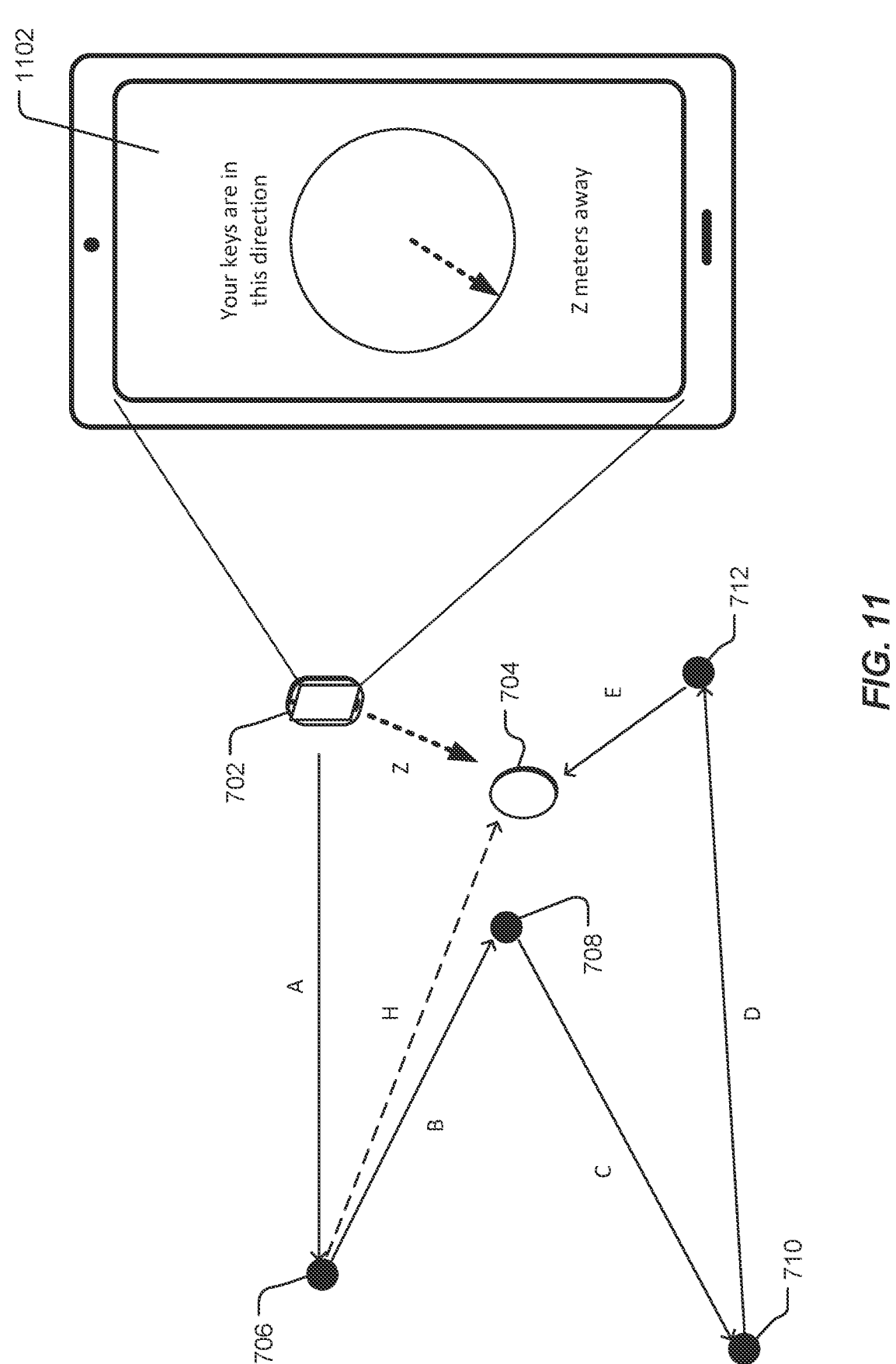
FIG. 11 is an example user interface for an asset tracking application.

Referring to FIG. 11, with further reference to FIG. 7, an example user interface for an asset tracking application is shown. The UE 702 may utilize the location information associated with the UWB capable devices 706, 708, 710, 712 to determine a relative position of the asset tag 704. For example, the UE 702 may determine a first vector 'A' to the IoT appliance 706 and receive vectors 'B', 'C', 'D', and 'E' from the IoT appliance 706 as described in FIG. 7. The UE 702 may be configured to utilize cartesian or polar coordinate operations based on the distances and angles of the vectors to compute a vector 'Z' indicating the location of the asset tag 704. In an example, one or more of the UWB capable devices 706, 708, 710, 712 may compute a relative range and bearing to the asset tag 704 and provide that relative location information to neighboring UWB devices. For example, the IoT appliance 706 may compute a vector 'H' based on vectors 'B', 'C', 'D' and 'E' and provide vector 'H' as location information to the UE 702. The UE 702 may be configured to compute the vector 'Z' based on 'A' and 'H'. The asset tag 704 may be attached to an item such as car keys, eyeglasses, a book, etc. and the user may enter an association of the item with a unique asset tag identification value. In an example, the asset tag 704 may be included in an electronic device such as a TV remote, tablet PC, smart watch, etc. A display 1102 on the UE 702 may be configured with a user interface to inform the user of the relative location of the asset tag 704. The user interface may utilize input from the IMU 270 (e.g., accelerometers 273 and gyroscopes 274) to display the relative direction of the vector 'Z' based on the current orientation of the UE 702. Other information, such as the name of the item and the range to the asset tag 704 may be presented on the display 1102.

Referring to FIG. 12, with further reference to FIGS. 1-11, a method 1200 for determining the location of a target device in a UWB network includes the stages shown. The method 1200 is, however, an example and not limiting. The method 1200 may be altered, e.g., by having stages added, removed, rearranged, combined, performed concurrently, and/or having single stages split into multiple stages. For example, an attempt to locate a target device at stage 1202 is optional as a searching device may query a bridge device without a prior search attempt. Determining a location of a bridge device at stage 1204 and querying the bridge device at stage 1206 may be combined in a single stage and performed simultaneously, or completed in reverse order. The UE 200 and the UWB device 380 are example means for performing the stages of the method 1200.

At stage 1202, the method optionally includes attempting to locate a target device. A UE 200, including a general-purpose processor 230 and a transceiver 215 is a means for attempting to locate a target device. In an example, a searching device, such as the UE 502, may attempt a UWB signal exchange with a target device, such as the asset tag 504, other network component such as a router or small cellular transceiver, or other devices configured to communicate via UWB signals. The signal exchange may be a positioning exchange 508 based on IEEE 802.15.4 standard such as described in FIG. 4A. Environmental factors (e.g., the barrier 501) may attenuate or otherwise obstruct the signals between the searching device and the target device. The reduced signal quality may diminish the ability of the searching device from determining an accurate range to the target device.

At stage 1204, the method includes determining a location of a bridge device. The general-purpose processor 230 and the transceiver 215 are means for determining the location of the bridge device. The UE 502 may broadcast a location request to nearby UWB devices (e.g., the smart speaker 506) and then perform a positioning message exchange with this nearby (i.e., bridge) device. For example, the UE 502 may determine the relative location (e.g., range and bearing) of the smart speaker 506 via the second message exchange 510.

At stage 1206, the method includes querying the bridge device for location information associated with the target device. The general-purpose processor 230 and the transceiver 215 are means for querying the bridge device. The query may be included in one or more messages transmitted to the bridge device via UWB signaling techniques. Other RF technologies, such as WiFi, Bluetooth, Zigbee, V2X, etc. may also be used to transmit the query based on the capabilities of the bridge device. In an example, the bridge device may maintain a data structure with location information of nearby devices and may determine the location of the target device based on previously obtained positioning measurements. The bridge device may also be configured to broadcast a location request to nearby UWB devices to determine location information for the target device. The bridge device may perform a positioning message exchange with the target device to determine the relative location of the target device. The bridge device may also determine an accuracy of the position estimate (e.g., based on the variance in ToF and/or AoA of multiple positioning message exchanges). In an example, the bridge device may be a mobile device, such as described in FIG. 6A configured to obtain location information for different UWB devices at different times and positions.

At stage 1208, the method includes receiving location information associated with the target device from the bridge device. The general-purpose processor 230 and the transceiver 215 are means for receiving location information associated with the target device. In an example, the bridge device may be configured to provide the relative position measurements (e.g., bearing and range) and accuracy information associated with the target device in response to receiving the query at stage 1206. The bridge device may be configured to periodically broadcast the position information associated with the target device to nearby UWB devices. The bridge device may be configured to provide the position information associated with the target device via UWB signaling techniques, and/or via other RF technologies, such as WiFi, Bluetooth, Zigbee, V2X, etc.

At stage 1210, the method includes determining a location of the target device based at least in part on the location of the bridge device and the location information associated with the target device. The general-purpose processor 230 is a means for determining the location of the target device. In an example, the UE 502 is configured to utilize the relative location of the bridge device (e.g., the smart speaker 506) and the position information obtained by the bridge device (e.g., based on the first message exchange 512) to determine the location of the asset tag 504. Cartesian or polar coordinate techniques may be used to determine the location of the asset tag 504 relative to the UE 502. In an example, the UE 502 may attempt to obtain multiple positioning measurements with the asset tag 504 to determine a quality of the resulting position estimate. The presence of the barrier 501 may cause an increase in the variation of the individual range and bearing estimates. The UE 502 may also make multiple attempts to determine the location of the asset tag 504 via one or more bridging devices. The UE 502 may compare the position estimates for the asset tag 504 obtained using both techniques (e.g., direct measurements, or via bridging devices) and select the more accurate position estimate (e.g., with the lower measurement variance). In an example, the UE 502 may be configured to determine a first position accuracy value (e.g., based on the variance of ToF and/or AoA measurements) for the asset tag 504 based on an attempt to locate the asset tag 504 utilizing the UWB signal exchanges at stage 1202, and determine a second position accuracy value for the asset tag 504 based on the location of a bridge device (e.g., the smart speaker 506) and the location information for the asset tag 504 provided by the bridge device, and then determine the location of the asset tag 504 based at least in part on a comparison of the first position accuracy value and the second position accuracy value. In an example, an accuracy threshold value (e.g., +/−10 cm, 5 cm, 1 cm, etc.) may be established and the UE 502 may be configured to obtain measurement values based on direct message exchanges with the asset tag 504, or via one or more bridge devices until measurements within the threshold value are achieved. In an example, the location information may include an indication of the orientation of the UWB devices obtaining the ToF and AoA measurements. Measurements from multiple devices in different orientations may be used to determine a 3D position of the target device.

Figure 13:
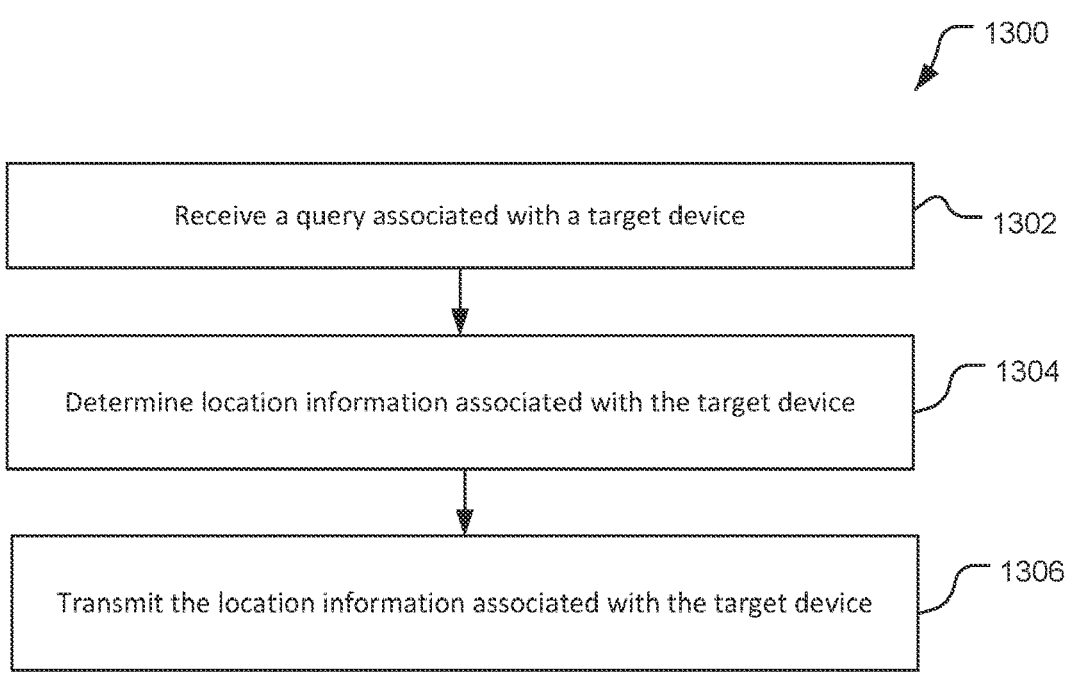
FIG. 13 is an example process flow for providing location information associated with a target device in a UWB network

Referring to FIG. 13, with further reference to FIGS. 1-11, a method 1300 for providing location information associated with a target device in a UWB network includes the stages shown. The method 1300 is, however, an example and not limiting. The method 1300 may be altered, e.g., by having stages added, removed, rearranged, combined, performed concurrently, and/or having single stages split into multiple stages. The method 1300 may be performed by one or more bridge devices in a UWB network.

At stage 1302, the method includes receiving a query associated with a target device. A UWB device 380, including the processor 381 and the wireless transceiver 385, is a means for receiving the query associated with a target device. In an example, referring to FIG. 9, a searching device 902 (e.g., the UE 200 or a UWB device 380) may transmit one or more UWB ranging and position information messages 914 including identification information associated with the target device 904. The messages may utilize UWB technology to provide the identification information of the target device 904. In an example, other RATs (e.g., WiFi, BT, Zigbee, etc.) may be utilized to provide the query. For example, a UE 200, an AP 300, or a UWB device 380 may be configured to transmit the query via WiFi or BT messages based on the network configuration.

At stage 1304, the method includes determining location information associated with the target device. The processor 381 and the wireless transceiver 385 are means for determining location information. In an example, a UWB device 380 such as the first bridge device 906, may maintain a data structure (e.g., the table 1004a) in memory 382 containing location information for the target device 904. The location information associated may be retrieved from the table 1004a based on the target device identification information received at stage 1302. In an example, the first bridge device 906 may determine the location information by broadcasting a query to nearby UWB devices (e.g., the second bridge device 908) with the target device identification information, and receive the location information from one or more nearby UWB devices. The first bridge device 906 may also be configured to exchange UWB ranging messages with the target device 904 to determine the location information. In an example, the first bridge device may be configured to exchange UWB ranging messages while in different orientations. For example a UE 200 may be the first bridge device 906 and may obtain range and bearing information while in a first orientation (e.g., horizontal) and then while in a second orientation (e.g., vertical). Other orientations may also be used to obtain the range and bearing information. The AoA information for different orientations may be used to determine a 3D position of the target object. In an example, the location information may include an indication of the orientation of the UWB device measuring the AoA.

At stage 1306, the method includes transmitting the location information associated with the target device. The processor 381 and the wireless transceiver 385 are means for transmitting the location information. The first bridge device 906 may transmit one or more position information reports 930 containing the location information to the searching device 902. In an example, the position information reports 930 may utilize a UWB radio access technology. Other RATs (e.g., WiFi, BT, Zigbee, etc.) may also be used to transmit the position reports based on the capabilities of the bridge device 906 and the searching device 902. For example, a searching device 902 may utilize WiFi ranging to determine the locations of one or more bridge devices, and to query the bridge devices to obtain a location of a target device. One or more bridge devices may utilize UWB ranging to determine the relative location of the target device and then report the location information to the searching device via WiFi. Other combinations of RATs may be used to propagate the UWB ranging measurements.

Figure 14:
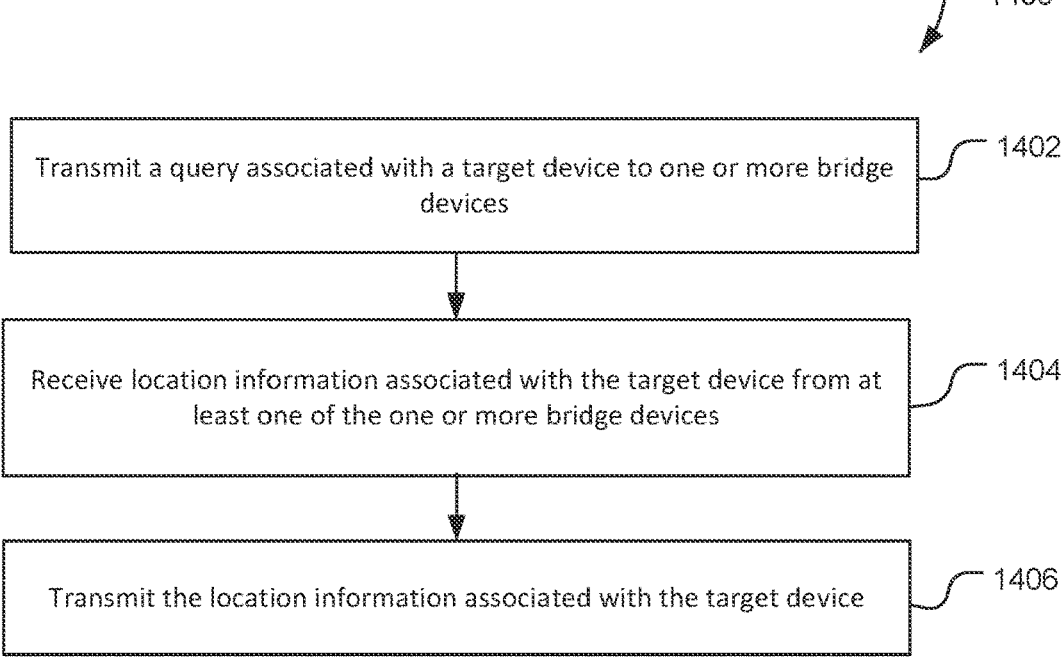
FIG. 14 is an example process flow for querying one or more bridge devices in an UWB network.

Referring to FIG. 14, with further reference to FIGS. 1-11, a method 1400 for querying one or more bridge devices in a UWB network includes the stages shown. The method 1400 is, however, an example and not limiting. The method 1400 may be altered, e.g., by having stages added, removed, rearranged, combined, performed concurrently, and/or having single stages split into multiple stages. The method 1400 may be performed by a searching device and/or one or more bridge devices in a UWB network.

At stage 1402, the method includes transmitting a query associated with a target device to one or more bridge devices. A UE 200 and/or a UWB device 380, including a processor 381 and a wireless transceiver 385, is a means for transmitting the query associated with a target device. In an example, referring to FIG. 9, a searching device 902 (e.g., the UE 200 or a UWB device 380) may transmit one or more UWB ranging and position information messages 914 including identification information associated with the target device 904. The messages may utilize UWB technology to provide the identification information of the target device 904. In an example, other RATs (e.g., WiFi, BT, Zigbee, etc.) may be utilized to provide the query. For example, a UE 200, an AP 300, or a UWB device 380 may be configured to transmit the query via WiFi or BT messages based on device capabilities.

At stage 1404, the method includes receiving location information associated with the target device from at least one of the one or more bridge devices. The processor 381 and the wireless transceiver 385 are means for receiving the location information. In an example, the second bridge device 908 may determine the location information by broadcasting a query to nearby UWB devices with the target device identification information and receive the location information from one or more nearby UWB devices. The second bridge device 908 may also be configured to exchange UWB ranging messages with the target device 904 to determine the location information. The second bridge device 908 may be configured to transmit one or more position information reports 926 containing the location information to the first bridge device 906.

At stage 1406, the method includes transmitting the location information associated with the target device. The processor 381 and the wireless transceiver 385 are means for transmitting the location information. The first bridge device 906 may transmit one or more position information reports 930 containing the location information to the searching device 902. In an example, the position information reports 930 may utilize a UWB radio access technology. Other RATs (e.g., WiFi, BT, Zigbee, etc.) may also be used to transmit the position reports based on the capabilities of the bridge device 906 and the searching device 902. In an example, the first bridge device 906 may be a mobile device 608 configured to receive the location information at stage 1404 while at a first location and then transmit the location information at one or more second locations.

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations. Components, functional or otherwise, shown in the figures and/or discussed herein as being connected or communicating with each other are communicatively coupled unless otherwise noted. That is, they may be directly or indirectly connected to enable communication between them.

As used herein, the singular forms "a," "an," and "the" include the plural forms as well, unless the context clearly indicates otherwise. For example, "a processor" may include one processor or multiple processors. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

As used herein, unless otherwise stated, a statement that a function or operation is "based on" an item or condition means that the function or operation is based on the stated item or condition and may be based on one or more items and/or conditions in addition to the stated item or condition.

Also, as used herein, "or" as used in a list of items (possibly prefaced by "at least one of" or prefaced by "one or more of") indicates a disjunctive list such that, for example, a list of "at least one of A. B, or C," or a list of "one or more of A, B, or C" or a list of A or B or C" means A. or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A. or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure). Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or even primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations, and does not limit the scope, applicability, or configurations of the claims. Rather, the preceding description of the configurations provides a description for implementing described techniques. Various changes may be made in the function and arrangement of elements without departing from the spirit or scope of the disclosure.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

Implementation examples are described in the following numbered clauses:

Clause 1. A method for providing location information associated with a target device in a ultrawideband (UWB) network, comprising: determining a location of a bridge device; querying the bridge device for location information associated with the target device; receiving location information associated with the target device from the bridge device; and determining a location of the target device based at least in part on the location of the bridge device and the location information associated with the target device.

Clause 2. The method of clause 1 wherein the location information received from the bridge device includes a first range and a first bearing to the target device obtained when the bridge device is in a first orientation, and a second range and a second bearing to the target device obtained when the bridge device is in a second orientation.

Clause 3. The method of clause 1 wherein determining the location of the bridge device comprises utilizing a UWB radio access technology and querying the bridge device comprises utilizing a radio access technology that is different than the UWB radio access technology.

Clause 4. The method of clause 3 wherein querying the bridge device comprises utilizing a WiFi based radio access technology or a Bluetooth based radio access technology.

Clause 5. The method of clause 1 wherein the bridge device is a mobile device configured to periodically move from a first location in a coverage area of the UWB network to a second location in the coverage area of the UWB network.

Clause 6. The method of clause 1 further comprising attempting to locate the target device utilizing a UWB radio access technology.

Clause 7. The method of clause 6 further comprising: determining a first position accuracy value for the target device based on an attempt to locate the target device utilizing the UWB radio access technology; determining a second position accuracy value for the target device based on the location of the bridge device and the location information associated with the target device; and determining the location of the target device based at least in part on a comparison of the first position accuracy value and the second position accuracy value.

Clause 8. The method of clause 7 wherein determining the location of the target device includes comparing the first position accuracy value or the second position accuracy value to a threshold.

Clause 9. The method of clause 1 further comprising: determining a satellite based position estimate with a satellite positioning system receiver or a terrestrial based position estimate with a communications transceiver; and determining the location of the target device based at least in part on the location of the bridge device, the location information associated with the target device, and the satellite based position estimate or the terrestrial based position estimate.

Clause 10. The method of clause 1 wherein the target device is a router or small cellular transceiver.

Clause 11. The method of clause 1 wherein the location information further comprises interference information obtained by the bridge device.

Clause 12. An apparatus, comprising: a memory, at least one transceiver; at least one processor communicatively coupled to the memory and the at least one transceiver, and configured to: determine a location of a bridge device; query the bridge device for location information associated with a target device; receive the location information associated with the target device from the bridge device; and determine a location of the target device based at least in part on the location of the bridge device and the location information associated with the target device.

Clause 13. The apparatus of clause 12 wherein the location information received from the bridge device includes a first range and a first bearing to the target device obtained when the bridge device is in a first orientation, and a second range and a second bearing to the target device obtained when the bridge device is in a second orientation.

Clause 14. The apparatus of clause 12 further comprising at least two transceivers, wherein the at least one processor is further configured to: determine the location of the bridge device using a UWB based radio access technology with a first transceiver; and query the bridge device using a radio access technology that is different than the UWB radio access technology with a second transceiver.

Clause 15. The apparatus of clause 14 wherein the second transceiver is configured to utilize a WiFi based radio access technology or a Bluetooth based radio access technology.

Clause 16. The apparatus of clause 12 wherein the bridge device is a mobile device configured to periodically move from a first location in a coverage area of the UWB network to a second location in the coverage area of the UWB network.

Clause 17. The apparatus of clause 12 wherein the at least one processor is further configured to attempt to locate the target device using a UWB radio access technology.

Clause 18. The apparatus of clause 17 wherein the at least one processor is further configured to: determine a first position accuracy value for the target device based on the attempt to locate the target device utilizing the UWB radio access technology; determine a second position accuracy value for the target device based on the location of the bridge device and the location information associated with the target device; and determine the location of the target device based at least in part on a comparison of the first position accuracy value and the second position accuracy value.

Clause 19. The apparatus of clause 18 wherein the at least one processor is further configured to compare the first position accuracy value or the second position accuracy value to a threshold to determine the location of the target device.

Clause 20. The apparatus of clause 12 further comprising a satellite positioning system receiver, wherein the at least one processor is further configured to: determine a satellite based position estimate with the satellite positioning system receiver; and determine the location of the target device based at least in part on the location of the bridge device, the location information associated with the target device, and the satellite based position estimate.

Clause 21. The apparatus of clause 12 wherein the target device is a router or small cellular transceiver.

Clause 22. The apparatus of clause 12 wherein the location information further comprises interference information obtained by the bridge device.

Clause 23. An apparatus for providing location information associated with a target device in a ultrawideband (UWB) network, comprising: means for determining a location of a bridge device; means for querying the bridge device for location information associated with the target device; means for receiving location information associated with the target device from the bridge device; and means for determining a location of the target device based at least in part on the location of the bridge device and the location information associated with the target device.

Clause 24. The apparatus of clause 23 wherein the location information received from the bridge device includes a first range and a first bearing to the target device obtained when the bridge device is in a first orientation, and a second range and a second bearing to the target device obtained when the bridge device is in a second orientation.

Clause 25. The apparatus of clause 23 wherein the means for determining the location of the bridge device comprises means for utilizing a UWB radio access technology and means for querying the bridge device comprises means for utilizing a radio access technology that is different than the UWB radio access technology.

Clause 26. The apparatus of clause 23 further comprising: means for determining a satellite based position estimate with a satellite positioning system receiver or a terrestrial based position estimate with a communications transceiver; and means for determining the location of the target device based at least in part on the location of the bridge device, the location information associated with the target device, and the satellite based position estimate or the terrestrial based position estimate.

Clause 27. The apparatus of clause 23 wherein the target device is a router or small cellular transceiver.

Clause 28. A non-transitory processor-readable storage medium comprising processor-readable instructions configured to cause one or more processors to provide location information associated with a target device in a ultrawideband (UWB) network, comprising: code for determining a location of a bridge device; code for querying the bridge device for location information associated with the target device; code for receiving location information associated with the target device from the bridge device; and code for determining a location of the target device based at least in part on the location of the bridge device and the location information associated with the target device.

Clause 29. The non-transitory processor-readable storage medium of clause 28 wherein the location information received from the bridge device includes a first range and a first bearing to the target device obtained when the bridge device is in a first orientation, and a second range and a second bearing to the target device obtained when the bridge device is in a second orientation.

Clause 30. The non-transitory processor-readable storage medium of clause 28 wherein the means for determining the location of the bridge device utilizes a UWB radio access technology and querying the bridge device utilizes a different radio access technology that is not the UWB radio access technology.

Clause 31. A method for providing location information associated with a target device in a ultrawideband (UWB) based network, comprising: receiving a query associated with the target device; determining location information associated with the target device, and transmitting the location information associated with the target device.

Clause 32. The method of clause 31 wherein determining the location information comprises querying a data structure based on the query associated with the target device.

Clause 33. The method of clause 31 wherein determining the location information comprises broadcasting a query to a neighboring UWB device.

Clause 34. The method of clause 31 wherein the location information associated with the target device includes a first range and a first bearing to the target device obtained from a bridge device in a first orientation, and a second range and a second bearing to the target device obtained from the bridge device in a second orientation.

Clause 35. The method of clause 31 wherein determining the location information associated with the target device comprises utilizing a UWB radio access technology and transmitting the location information associated with the target device comprises utilizing a radio access technology that is different than the UWB radio access technology.

Clause 36. The method of clause 31 wherein determining the location information associated with the target device comprises utilizing a UWB radio access technology and receiving the query associated with the target device comprises utilizing a radio access technology that is different than the UWB radio access technology.

Clause 37. A method for querying one or more bridge devices in a ultrawideband (UWB) network, comprising: transmitting a query associated with a target device to the one or more bridge devices; receiving location information associated with the target device from at least one of the one or more bridge devices; and transmitting the location information associated with the target device.

Clause 38. The method of clause 37 wherein the query associated with the target device includes identification information associated with the target device.

Clause 39. The method of clause 37 wherein the location information associated with the target device includes a first range and a first bearing to the target device obtained when the at least one of the one or more bridge devices is in a first orientation, and a second range and a second bearing to the target device obtained when the at least one of the one or more bridge devices is in a second orientation.

Clause 40. The method of clause 37 wherein receiving the location information associated with the target device comprises utilizing a UWB radio access technology and transmitting the location information associated with the target device comprises utilizing a radio access technology that is different than the UWB radio access technology.

Clause 41. The method of clause 37 wherein transmitting the query associated with a target device comprises utilizing a UWB radio access technology and receiving the location information associated with the target device comprises utilizing a radio access technology that is different than the UWB radio access technology.

Clause 42. The method of clause 37 wherein transmitting the query associated with a target device comprises utilizing a UWB radio access technology and transmitting the location information associated with the target device comprises utilizing a radio access technology that is different than the UWB radio access technology.

Clause 43. An apparatus, comprising: a memory; at least one transceiver; at least one processor communicatively coupled to the memory and the at least one transceiver, and configured to: receive a query associated with a target device; determine location information associated with the target device; and transmit the location information associated with the target device.

Clause 44. The apparatus of clause 43 wherein the at least one processor is further configured to query a data structure based on the query associated with the target device to determine the location information.

Clause 45. The apparatus of clause 43 wherein the at least one processor is further configured to broadcast a query to a neighboring ultrawideband (UWB) device to determine the location information.

Clause 46. The apparatus of clause 43 wherein the location information associated with the target device includes a first range and a first bearing to the target device obtained from a bridge device in a first orientation, and a second range and a second bearing to the target device obtained from the bridge device in a second orientation.

Clause 47. The apparatus of clause 43 wherein the at least one processor is further configured to determine the location information associated with the target device utilizing an ultrawideband (UWB) based radio access technology and transmit the location information associated with the target device utilizing a radio access technology that is different than the UWB based radio access technology.

Clause 48. The apparatus of clause 43 wherein the at least one processor is further configured to determine the location information associated with the target device utilizing an ultrawideband (UWB) based radio access technology and receive the query associated with the target device utilizing a radio access technology that is different than the UWB based radio access technology.

Clause 49. An apparatus, comprising: a memory; at least one transceiver; at least one processor communicatively coupled to the memory and the at least one transceiver, and configured to: transmit a query associated with a target device to one or more bridge devices; receive location information associated with the target device from at least one of the one or more bridge devices; and transmit the location information associated with the target device.

Clause 50. The apparatus of clause 49 wherein the query associated with the target device includes identification information associated with the target device.

Clause 51. The apparatus of clause 49 wherein the location information associated with the target device includes a first range and a first bearing to the target device obtained when the at least one of the one or more bridge devices is in a first orientation, and a second range and a second bearing to the target device obtained when the at least one of the one or more bridge devices is in a second orientation.

Clause 52. The apparatus of clause 49 wherein the at least one processor is further configured to receive the location information associated with the target device utilizing an ultrawideband (UWB) based radio access technology and transmit the location information associated with the target device utilizing a radio access technology that is different than the UWB based radio access technology.

Clause 53. The apparatus of clause 49 wherein the at least one processor is further configured to transmit the query associated with a target device utilizing an ultrawideband (UWB) based radio access technology and receive the location information associated with the target device utilizing a radio access technology that is different than the UWB based radio access technology.

Clause 54. The apparatus of clause 49 wherein the at least one processor is further configured to transmit the query associated with a target device utilizing an ultrawideband (UWB) based radio access technology and transmit the location information associated with the target device utilizing a radio access technology that is different than the UWB based radio access technology.

Clause 55. An apparatus for providing location information associated with a target device in a ultrawideband (UWB) based network, comprising: means for receiving a query associated with the target device; means for determining location information associated with the target device; and means for transmitting the location information associated with the target device.

Clause 56. An apparatus for querying one or more bridge devices in a ultrawideband (UWB) network, comprising: means for transmitting a query associated with a target device to the one or more bridge devices; means for receiving location information associated with the target device from at least one of the one or more bridge devices; and means for transmitting the location information associated with the target device.

Clause 57. A non-transitory processor-readable storage medium comprising processor-readable instructions configured to cause one or more processors to provide location information associated with a target device in a ultrawideband (UWB) based network, comprising: code for receiving a query associated with the target device, code for determining location information associated with the target device; and code for transmitting the location information associated with the target device.

Clause 58. A non-transitory processor-readable storage medium comprising processor-readable instructions configured to cause one or more processors to query one or more bridge devices in a ultrawideband (UWB) network, comprising: code for transmitting a query associated with a target device to the one or more bridge devices; code for receiving location information associated with the target device from at least one of the one or more bridge devices; and code for transmitting the location information associated with the target device.

The invention claimed is:

1. A method for providing location information associated with a target device in an ultrawideband (UWB) network, the method comprising:

determining, by a searching device that is separate from the target device, a location of a bridge device that is separate from the searching device and the target device;

querying, by the searching device, the bridge device for location information associated with the target device;

receiving, by the searching device, location information associated with the target device from the bridge device; and determining, by the searching device, a location of the target device based at least in part on the location of the bridge device and the location information associated with the target device, wherein the location information received from the bridge device includes a first range and a first bearing to the target device obtained when the bridge device is in a horizontal orientation, and a second range and a second bearing to the target device obtained when the bridge device is in a vertical orientation.

2. The method of claim 1 wherein determining the location of the bridge device comprises utilizing a UWB radio access technology and querying the bridge device comprises utilizing a radio access technology that is different than the UWB radio access technology.

3. The method of claim 2 wherein querying the bridge device comprises utilizing a WiFi based radio access technology or a Bluetooth based radio access technology.

4. The method of claim 1 wherein the bridge device is a mobile device configured to periodically move from a first location in a coverage area of the UWB network to a second location in the coverage area of the UWB network.

5. The method of claim 1 further comprising attempting to locate the target device utilizing a UWB radio access technology.

6. The method of claim 5 further comprising:

determining a first position accuracy value for the target device based on an attempt to locate the target device utilizing the UWB radio access technology;

determining a second position accuracy value for the target device based on the location of the bridge device and the location information associated with the target device; and determining the location of the target device based at least in part on a comparison of the first position accuracy value and the second position accuracy value.

7. The method of claim 6 wherein determining the location of the target device includes comparing the first position accuracy value or the second position accuracy value to a threshold.

8. The method of claim 1 further comprising:

determining a satellite-based position estimate with a satellite positioning system receiver or a terrestrial-based position estimate with a communications transceiver; and determining the location of the target device based at least in part on the location of the bridge device, the location information associated with the target device, and the satellite-based position estimate or the terrestrial-based position estimate.

9. The method of claim 1 wherein the target device is a router or small cellular transceiver.

10. The method of claim 1 wherein the location information further comprises interference information obtained by the bridge device.

11. An apparatus for providing location information associated with a target device in an ultrawideband (UWB) network, the apparatus comprising:

a memory;

at least one transceiver;

at least one processor communicatively coupled to the memory and the at least one transceiver, and configured to:

determine a location of a bridge device that is separate from the apparatus and the target device;

query the bridge device for location information associated with the target device;

receive the location information associated with the target device from the bridge device; and determine a location of the target device based at least in part on the location of the bridge device and the location information associated with the target device, wherein the location information received from the bridge device includes a first range and a first bearing to the target device obtained when the bridge device is in a horizontal orientation, and a second range and a second bearing to the target device obtained when the bridge device is in a vertical orientation.

12. The apparatus of claim 11 further comprising at least two transceivers, wherein the at least one processor is further configured to:

determine the location of the bridge device using a UWB based radio access technology with a first transceiver; and query the bridge device using a radio access technology that is different than the UWB radio access technology with a second transceiver.

13. The apparatus of claim 12 wherein the second transceiver is configured to utilize a WiFi based radio access technology or a Bluetooth based radio access technology.

14. The apparatus of claim 11 wherein the bridge device is a mobile device configured to periodically move from a first location in a coverage area of the UWB network to a second location in the coverage area of the UWB network.

15. The apparatus of claim 11 wherein the at least one processor is further configured to attempt to locate the target device using a UWB radio access technology.

16. The apparatus of claim 15 wherein the at least one processor is further configured to:

determine a first position accuracy value for the target device based on the attempt to locate the target device utilizing the UWB radio access technology;

determine a second position accuracy value for the target device based on the location of the bridge device and the location information associated with the target device; and determine the location of the target device based at least in part on a comparison of the first position accuracy value and the second position accuracy value.

17. The apparatus of claim 16 wherein the at least one processor is further configured to compare the first position accuracy value or the second position accuracy value to a threshold to determine the location of the target device.

18. The apparatus of claim 11 further comprising a satellite positioning system receiver, wherein the at least one processor is further configured to:

determine a satellite-based position estimate with the satellite positioning system receiver; and determine the location of the target device based at least in part on the location of the bridge device, the location information associated with the target device, and the satellite-based position estimate.

19. The apparatus of claim 11 wherein the target device is a router or small cellular transceiver.

20. The apparatus of claim 11 wherein the location information further comprises interference information obtained by the bridge device.

21. An apparatus for providing location information associated with a target device in an ultrawideband (UWB) network, the apparatus comprising:

means for determining a location of a bridge device that is separate from the apparatus and the target device;

means for querying the bridge device for location information associated with the target device;

means for receiving location information associated with the target device from the bridge device; and means for determining a location of the target device based at least in part on the location of the bridge device and the location information associated with the target device, wherein the location information received from the bridge device includes a first range and a first bearing to the target device obtained when the bridge device is in a horizontal orientation, and a second range and a second bearing to the target device obtained when the bridge device is in a vertical orientation.

22. The apparatus of claim 21 wherein the means for determining the location of the bridge device comprises means for utilizing a UWB radio access technology and means for querying the bridge device comprises means for utilizing a radio access technology that is different than the UWB radio access technology.

23. The apparatus of claim 21 further comprising:

means for determining a satellite-based position estimate with a satellite positioning system receiver or a terrestrial-based position estimate with a communications transceiver; and means for determining the location of the target device based at least in part on the location of the bridge device, the location information associated with the target device, and the satellite-based position estimate or the terrestrial-based position estimate.

24. The apparatus of claim 21 wherein the target device is a router or small cellular transceiver.

25. A non-transitory processor-readable storage medium comprising processor-readable instructions configured to cause one or more processors of an apparatus to provide location information associated with a target device in an ultrawideband (UWB) network, comprising:

code for determining a location of a bridge device that is separate from the apparatus and the target device;

code for querying the bridge device for location information associated with the target device;

code for receiving location information associated with the target device from the bridge device; and code for determining a location of the target device based at least in part on the location of the bridge device and the location information associated with the target device, wherein the location information received from the bridge device includes a first range and a first bearing to the target device obtained when the bridge device is in a horizontal orientation, and a second range and a second bearing to the target device obtained when the bridge device is in a vertical orientation.

26. The non-transitory processor-readable storage medium of claim 25 wherein the code for determining the location of the bridge device utilizes a UWB radio access technology and querying the bridge device utilizes a different radio access technology that is not the UWB radio access technology.

* * * * *